(12) United States Patent
Clark et al.

(10) Patent No.: US 9,740,494 B2
(45) Date of Patent: Aug. 22, 2017

(54) LOW COMPLEXITY OUT-OF-ORDER ISSUE LOGIC USING STATIC CIRCUITS

(75) Inventors: Lawrence T. Clark, Phoenix, AZ (US); Siddhesh Mhambrey, Austin, TX (US); Satendra Kumar Maurya, Tempe, AZ (US)

(73) Assignee: Arizona Board of Regents for and on behalf of Arizona State University, Scottsdale, AZ (US)

( * ) Notice: Subject to any disclaimer, the term of this patent is extended or adjusted under 35 U.S.C. 154(b) by 1054 days.

(21) Appl. No.: 13/459,964

(22) Filed: Apr. 30, 2012

(65) Prior Publication Data
US 2012/0278593 A1    Nov. 1, 2012

Related U.S. Application Data

(60) Provisional application No. 61/480,785, filed on Apr. 29, 2011.

(51) Int. Cl.
*G06F 9/38* (2006.01)

(52) U.S. Cl.
CPC .......... *G06F 9/3836* (2013.01); *G06F 9/3814* (2013.01); *G06F 9/3838* (2013.01); *G06F 9/3851* (2013.01)

(58) Field of Classification Search
CPC .............................. G06F 9/3836; G06F 9/3851
USPC .................................................. 712/214, 215
See application file for complete search history.

(56) References Cited

U.S. PATENT DOCUMENTS

| 5,623,619 | A | 4/1997 | Witt |
| 5,651,125 | A | 7/1997 | Witt et al. |
| 6,065,105 | A * | 5/2000 | Zaidi et al. ..................... 712/23 |
| 6,260,135 | B1 * | 7/2001 | Yoshida ........................ 712/214 |
| 6,557,095 | B1 | 4/2003 | Henstrom |
| 7,080,170 | B1 | 7/2006 | Zuraski, Jr. et al. |
| 2003/0163671 | A1 | 8/2003 | Gschwind et al. |
| 2008/0313438 | A1 * | 12/2008 | Luick ........................... 712/222 |
| 2009/0271592 | A1 * | 10/2009 | Jensen ......................... 712/214 |

* cited by examiner

*Primary Examiner* — Yuqing Xiao
(74) *Attorney, Agent, or Firm* — Withrow & Terranova, P.L.L.C.

(57) ABSTRACT

Instruction issue circuits are disclosed that are configured to issue multiple instructions within a superscalar pipeline of a microprocessor. The instruction issue circuit includes an instruction queue that stores instructions. A ready generation circuit is operably associated with the instruction queue and generates ready signals that indicate which instructions in the instruction queue are ready for execution. To simplify the instruction issue circuit, the instruction issue circuit has group blocks. Each group block receives a different group of the ready signals corresponding to a different group of the instructions. Each group block generates a group output indicating a group set within the corresponding group of the instructions that has a highest instruction execution priority and are ready for execution. By splitting the ready signals into groups, the groups of ready signals can be processed in parallel thereby reducing both the resulting delay and complexity of the instruction issue circuit.

13 Claims, 17 Drawing Sheets

LOW COMPLEXITY OUT-OF-ORDER ISSUE LOGIC USING STATIC CIRCUITS

RELATED APPLICATIONS

This application claims the benefit of provisional patent application Ser. No. 61/480,785, filed Apr. 29, 2011, the disclosure of which is hereby incorporated herein by reference in its entirety.

FIELD OF THE DISCLOSURE

The disclosure relates generally to superscalar pipelines and instruction issue circuits within microprocessors.

BACKGROUND

A fundamental property of a superscalar pipeline is the execution of multiple instructions per clock cycle. In essence, the superscalar pipeline allows for various processing components (if not all) in the microprocessor to be used during a single clock cycle. Superscalar techniques based on extracting instruction-level parallelism (ILP) have been a major contribution to high performance microprocessor design throughout the last two decades. The number of instructions executed per cycle (IPC) has increased substantially through superscalar techniques like speculative execution and dynamic scheduling.

To allow for the execution of multiple instructions, the out-of-order superscalar pipeline includes an instruction issue circuit. The instruction issue circuit includes an instruction queue that stores instructions awaiting execution. The maximum number of instructions that can be held in the instruction queue is generally referred to as a window size of the instruction queue. The number of instructions issued for execution by the instruction issue circuit is referred to as the issue width of the instruction issue circuit.

Unfortunately, increasing the window size and the issue width leads to a quadratic increase in the delay through the instruction issue circuit. To increase the window size and issue width, some tree-based schemes have attempted to distribute instructions into FIFO buffers so that only instructions at the head of the FIFO buffers are issued. Oldest-first selection gives an IPC benefit of up to 8% over a random position based scheme and provides better instruction sequencing. However, the steering logic for these tree-based schemes is immensely complex. There have been attempts to reduce this complexity. For example, a dynamic request-grant arbitration scheme has been proposed using an instruction queue compaction scheme that preserves the temporal order of the instructions within the instruction queue. However, the dynamic request-grant arbitration scheme requires a multitude of serial operations thereby resulting in increased delay. Dynamic logic is used to compensate for the higher delay but comes at the cost of higher power consumption.

Therefore, what is needed is an instruction issue circuit that reduces serial operations while having a more simplified configuration.

SUMMARY

This disclosure relates to instruction issue circuits configured to issue multiple instructions within a superscalar pipeline of a microprocessor. The instruction issue circuit includes an instruction queue operable to store instructions that are ordered in accordance with an instruction execution priority. In general, the oldest instructions in the instruction queue have the highest instruction execution priority while the newest instructions in the instruction queue have the lowest instruction execution priority. The instruction queue also includes a ready generation circuit operably associated with the instruction queue. The ready generation circuit generates ready signals, wherein each ready signal corresponds to one of the instructions in the instruction queue and indicates whether the corresponding instruction is ready for execution.

To reduce the complexity of processing the ready signals from the ready generation circuit, the instruction issue circuit includes group blocks. Each group block receives a different group of the ready signals that correspond to a different group of the instructions. By splitting the ready signals into groups, the various groups of ready signals can be processed in parallel thereby reducing both the required delay and complexity of the instruction issue circuit.

Each group block generates a corresponding group output based on the received group of ready signals. Accordingly, for each group block, the corresponding group output corresponds to the same group of instructions as the received group of ready signals. Each of the group outputs indicates a group set within the corresponding group of instructions having a highest instruction execution priority and are ready for execution. Downstream circuitry within the instruction issue circuit can then receive the group outputs to determine which instructions in the instruction queue should be issued.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
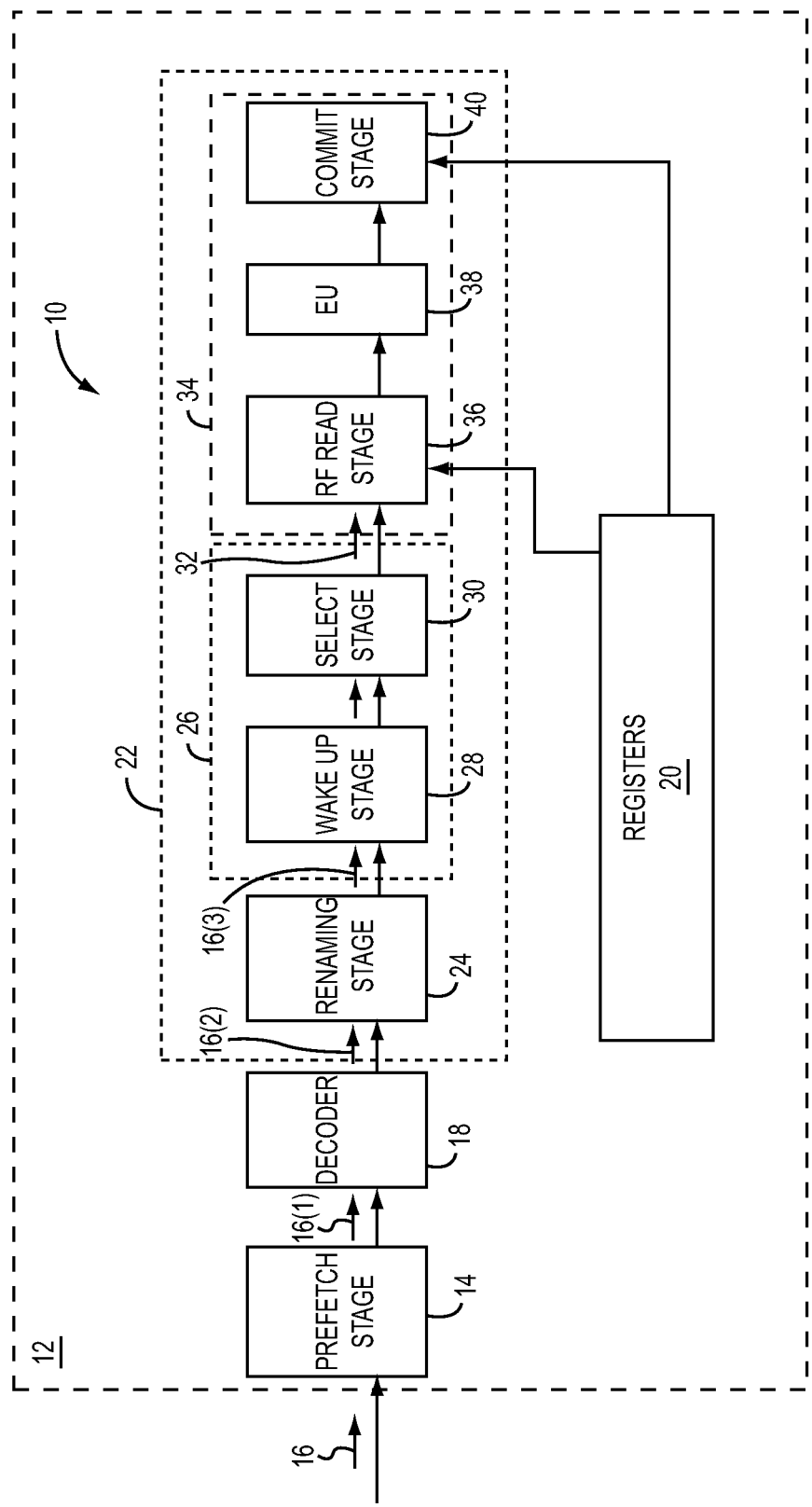
FIG. 1 illustrates one embodiment of a microprocessor that includes a superscalar pipeline that includes an exemplary instruction issue circuit.

FIG. 1 illustrates one embodiment of a superscalar pipeline 10 within a microprocessor 12. The superscalar pipeline 10 allows the microprocessor 12 to load and store instructions from an external memory source so that multiple instructions can be processed by the microprocessor 12 in one clock cycle. In other words, the superscalar pipeline 10 allows for the instruction execution rate of the microprocessor 12 to exceed the clock cycle rate. To do this, the superscalar pipeline 10 of the microprocessor 12 includes a pre-fetch stage 14. The pre-fetch stage 14 is operable to fetch instructions 16 out from an external physical memory device, such as Random Access Memory (RAM).

The pre-fetched instructions 16(1) may then be transmitted to an instruction decoder 18. The decoder 18 determines the function (adding, subtracting, etc.) of the pre-fetched instruction 16(1) and thus what execution unit of the microprocessor 12 is relevant to performing the pre-fetched instruction 16(1). The microprocessor 12 also includes registers 20. Register values stored by the registers 20 are used as operands for the pre-fetched instructions 16. The decoder 18 also provides register fields that identify the registers 20 so that the register values stored by particular registers 20 are used as operands for particular instructions 16.

Decoded instructions 16(2) are then provided to superscalar stages 22 of the superscalar pipeline 10. In this particular embodiment, the decoded instructions 16(2) are initially received by a renaming stage 24. The renaming stage 24 allocates the registers to the instructions 16 and allows for superscalar processing to occur. The reordering of instructions is based on data dependencies resulting from the use of common registers 20 by the instructions 16. The renaming stage 24 thus allows for out-of-order execution and may eliminate write-after-read (WAR) hazards and write-after-write (WAW) hazards when using the registers 20.

After renaming by the renaming stage 24, renamed instructions 16(3) are then provided to an instruction issue circuit 26. The instruction issue circuit 26 selects the highest priority (generally oldest) renamed instructions 16(3) that are ready for execution. As explained in further detail, the instruction issue circuit 26 includes a wakeup stage 28 and a select stage 30. The wakeup stage 28 receives and stores the renamed instructions 16(3) to await execution. In this exemplary embodiment, the wakeup stage 28 includes an instruction queue (not shown in FIG. 1) for storing the renamed instructions 16(3).

The select stage 30 within the instruction issue circuit 26 is operable to select the renamed instructions 16(3) for execution. The select stage 30 may select instructions for execution by issuing a global grant output 32. Among the renamed instructions 16(3) that are ready for execution within the instruction queue, the global grant output 32 indicates a global set of the renamed instructions 16(3) having a highest instruction execution priority whose operands are ready in the next instruction issue cycle. The global grant output 32 is passed to a corresponding execution component 34, which includes a register file (RF) read stage 36, an execution unit (EU) 38, and a commit stage 40. Based on the global grant output 32, the RF read stage 36 is operable to write the appropriate register values from the registers 20 to a register file maintained by the execution component 34. In this manner, these register values are used as the operands for the renamed instruction 16(3). A functional operation is performed by the EU 38 to implement the executed instruction. Subsequently, the commit stage 40 writes the result (i.e., the destination operand) to an appropriate one of the registers 20. The superscalar pipeline 10 allows for the execution of instructions by multiple execution units (not all shown simultaneously) in the microprocessor 12 to ensure that (in general) the execution units are performing an operation during every clock cycle.

Figure 2:
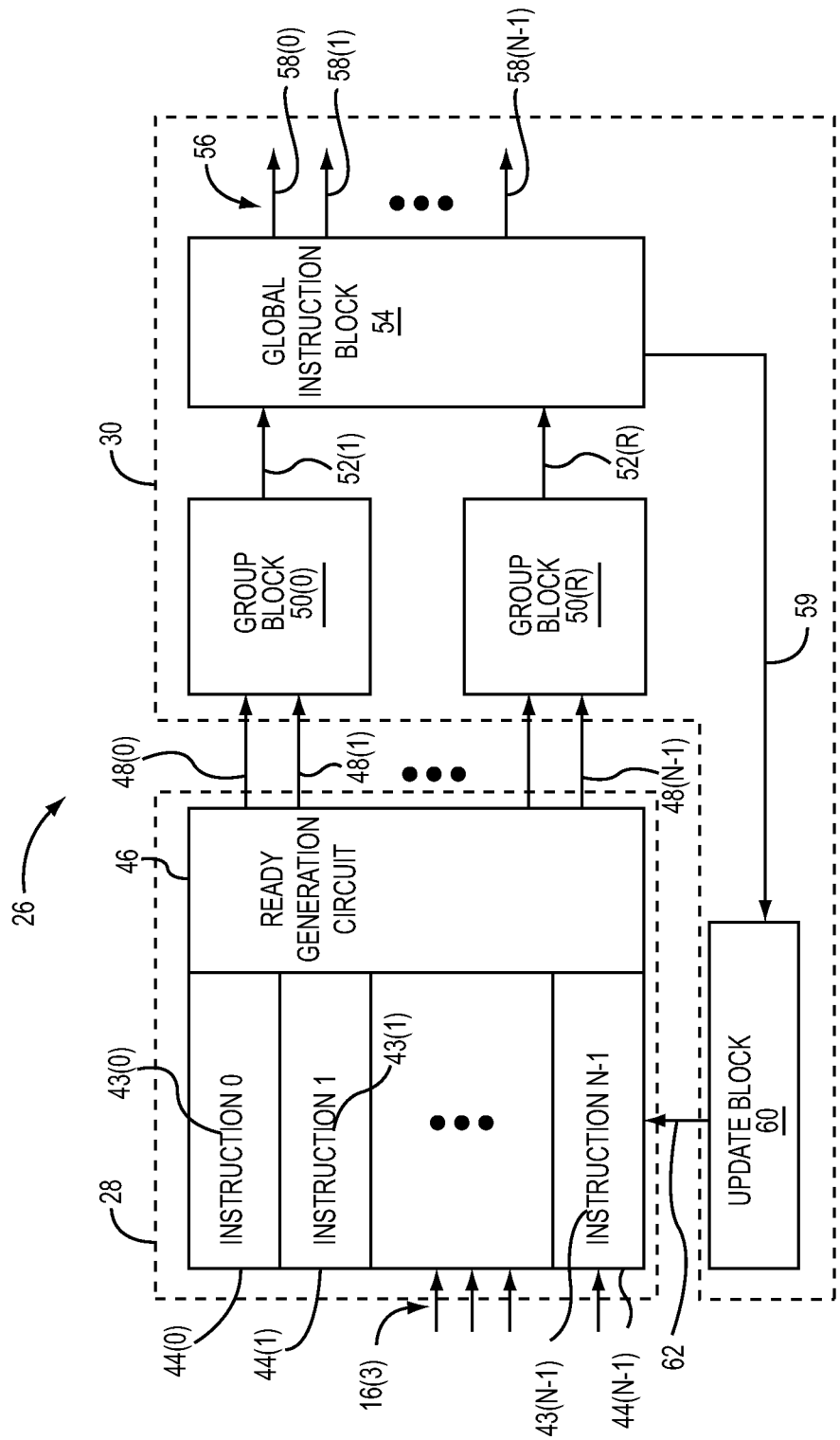
FIG. 2 shows a more detailed example of the exemplary instruction issue circuit of FIG. 1 with an instruction queue and an issue stage that includes a plurality of group blocks.

FIG. 2 illustrates one exemplary embodiment of the instruction issue circuit 26 shown in FIG. 1. The wakeup stage 28 includes an instruction queue 42 operable to store instructions (referenced generically as elements 43 and specifically as elements 43(0)-43(N-1)). In this case, the number of instructions 43 within the instruction queue 42 is represented by an integer, N. Thus, a window size (i.e., the maximum number of instructions 43 that can be stored in the instruction queue 42) is N. The instructions 43 were received by the instruction queue 42 as the renamed instructions 16(3) and are ordered in accordance with an instruction execution priority. In this example, instruction 43(0) has the highest instruction execution priority since instruction 43(0) has been in the instruction queue 42 for the longest amount of time while instruction 43(N-1) has the lowest instruction execution priority since it has been in the instruction queue 42 for the least amount of time. Additionally, the instruction queue 42 includes a plurality of queue entries (referred to generically as elements 44 and specifically as elements 44(0)-44(N-1). Each queue entry 44 is configured to store a different corresponding instruction 43.

The wakeup stage 28 further includes a ready generation circuit 46. The ready generation circuit 46 is operably associated with the instruction queue 42 to generate a plurality of ready signals (referred to generically as element 48 and specifically as elements 48(1)-48(N-1)). As explained in further detail below, each ready signal 48 indicates whether a different corresponding instruction 43 stored by the instruction queue 42 is ready for execution. To detect whether each of the instructions 43 in the instruction queue 42 is ready for execution, the logic of the ready generation circuit 46 may check whether the registers 20 (shown in FIG. 1) with operands for the instruction 43 are available in the next issue cycle. If so, the ready signal 48 that corresponds to the particular queue entry 44 storing the instruction 43 indicates that the particular registers 20 are available for execution during the next clock cycle and therefore the instruction 43 is ready for execution. On the other hand, if the particular registers 20 are not available, the ready signal 48 that corresponds to the particular queue entry 44 storing the instruction 43 indicates that the particular registers 20 will not be updated in the clock cycle, and thus are not available for execution during the next clock cycle and thus, the instruction 43 is not ready for execution.

The ready signals 48 are then transmitted to the select stage 30. The select stage 30 is configured to select which instructions 43 in the instruction queue 42 are to be issued for execution based on the ready signals 48. In the illustrated embodiment, the select stage 30 includes a plurality of group blocks (referred to generically as element 50 and specifically as elements 50(1)-50(R)). More specifically, each group block 50 receives a different group of the plurality of ready signals 48 corresponding to a different group of the plurality of instructions 43. Furthermore, each group block 50 generates a corresponding group output (referred to generically as elements 52 and specifically as elements 52(1)-52(R)). The group outputs 52 each indicate a group set within the group of the plurality of instructions 43 that correspond to the group block 50. The group set within the group of instructions 43 correspond to the ready signals 48 received by the particular group block 50 but are the set of the instructions 43 from the group that have the highest instruction execution priority among the group that are also ready for execution.

In the embodiment illustrated in FIG. 2, the instruction issue circuit 26 also includes a global instruction block 54. The global instruction block 54 receives the group outputs 52 from the group blocks 50. From the group outputs 52 provided by the group blocks 50, the global instruction block 54 can select the instructions 43 from among all of the instructions 43 that are both ready for execution and have the highest instruction execution priority from among all of the instructions 43. To do this, the global instruction block 54 generates a global grant output 56 based on the plurality of group outputs 52. The global grant output 56 indicates a global set of the plurality of instructions 43 having the highest instruction execution priority among the instructions 43 that are ready for execution.

In this example, the global grant output 56 is provided as a plurality of grant signals (referred to generically as elements 58 and specifically as elements 58(0)-58(N−1)). There are N numbers of grant signals 58($x$) each indicating whether one of the instructions 43 corresponding to one of the queue entries 44 should be granted. Of these N numbers of grant signals 58, only an integer number w of the grant signals 58 actually indicate that the corresponding instruction 43 is to be issued for execution while N-w of the grant signals 58 indicate that the corresponding instruction 43 should not be issued for execution. The integer w is thus the issue width of the instruction queue 42 since it indicates the number of instructions 43 to be issued for execution during a clock cycle. For instance, in one embodiment, the window size N of the instruction queue 42 is thirty-two (32) since the instruction queue 42 can store up to thirty-two (32) instructions 43. The issue width of the instruction queue 42 is four (4) because four (4) instructions 43 may be issued from the instruction queue 42 every clock cycle. The four (4) instructions 43 issued for execution should be the global set of the instructions 43 having the highest instruction execution priority among all of the instructions 43 in the instruction queue 42 that are also ready for execution.

Once the global set of instructions 43 from the appropriate queue entries 44 are issued for execution, the global instruction block 54 provides an update input 59 to an update block 60. The update input 59 may be the global grant output 56 or some other type of signal depending on the functional characteristics of the update block 60 and the instruction queue 42. From the update input 59, the update block 60 is configured to generate an update output 62 in response to the update input 59. After the global set of instructions 43 are issued for execution, a residual set of the instructions 43 are to remain in the instruction queue 42 to await execution. To maintain instructions 43 ordered in accordance with the instruction execution priority, the instructions 43 which have queue entries 44 above them with instructions 43 that were issued should be moved up. The update output 62 indicates in which of the plurality of queue entries 44 each of the instructions 43 within the residual set should be stored in once the global set of the plurality of instructions has been issued for execution. In response to the update output 62, the instruction queue 42 is operable to move the residual instructions 43 to new (higher) queue entries 44 to maintain the instruction execution priority of the residual set once the global set has been issued.

Figure 3:
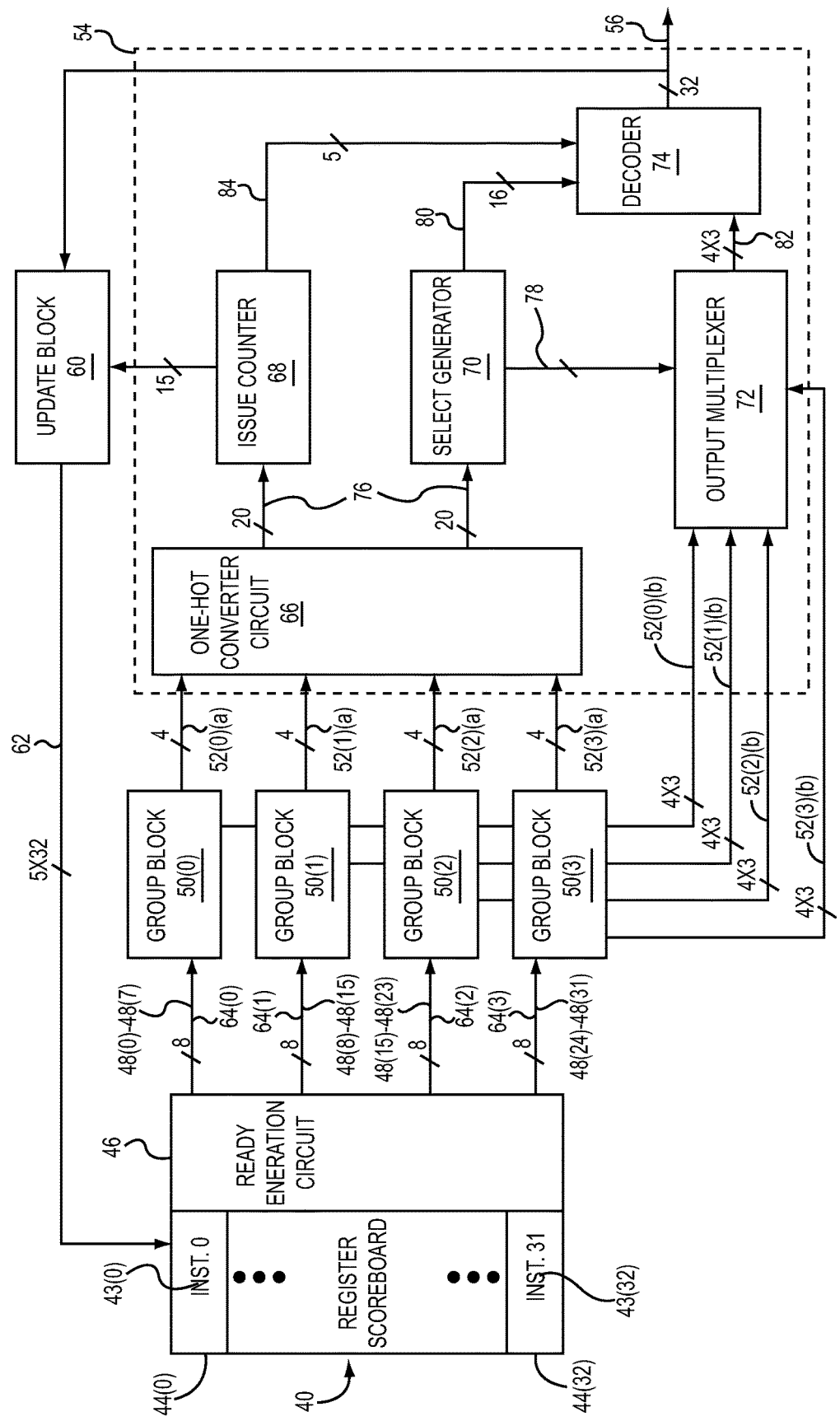
FIG. 3 illustrates one embodiment of the exemplary instruction issue circuit of FIG. 2 in which the instruction queue is a register scoreboard and the group blocks are sorters.

FIG. 3 illustrates a more detailed exemplary embodiment of the instruction issue circuit 26 shown in FIG. 2. The instruction queue 42 in FIG. 3 is implemented as a register scoreboard and has queue entries 44(0)-44(31) to store up to thirty-two of the instructions 43. More specifically, each of the queue entries 44(0)-44(31) stores a corresponding one of the instructions 43(0)-43(31). The ready generation circuit 46 generates ready signals 48 in response to an activation edge of the clock cycle based on the status of the instruction operands for the instructions 43. These ready signals 48 are split into groups (referred to generically as element 64 and specifically as elements 64(0)-64(3)) of eight. Thus, group 64(0) includes ready signals 48(0)-48(7). The group 64(0) thus corresponds to queue entries 44(0)-44(7) and instructions 43(0)-43(7) within the instruction queue 42. Analogously, group 64(1) includes ready signals 48(8)-48(15). The group 64(1) corresponds to queue entries 44(8)-44(15) and instructions 43(8)-43(15) within the instruction queue 42. Furthermore, group 64(2) includes ready signals 48(16)-48(23). The group 64(2) corresponds to queue entries 44(16)-44(23) and instructions 43(16)-43(23) within the instruction queue 42. Finally, group 64(3) includes ready signals 48(24)-48(31). The group 64(3) corresponds to queue entries 44(24)-44(31) and instructions 43(24)-43(31) within the instruction queue 42.

Each group 64 is provided to one of the group blocks 50. More specifically, the group 64(0) is provided to the group block 50(0), the group 64(1) is provided to the group block 50(1), the group 64(2) is provided to the group block 50(2), and the group 64(3) is provided to the group block 50(3). The group blocks 50 process the group 64 of ready signals 48 in parallel. In this particular embodiment, the group blocks 50 are four 8-entry sorters and each group block 50 generates one of the group outputs 52.

Each group output 52 from each of the group blocks 50 has two parts, a ready indicator 52(0)($a$)-52(3)($a$), and an address set 52(0)($b$)-52(3)($b$). Each ready indicator 52(0)($a$)-52(3)($a$) indicates a number of the group of the plurality of instructions 43 that are ready for execution. In this embodiment, the group blocks 50 produce the number of instructions 43 that are ready from a particular group in a thermometric coded form. For example, if four or more of the instructions 43(0)-43(7) are ready for execution, the ready indicator 52(0)(a) may be provided as "1111." On the other hand, if three of the instructions 43(0)-43(7) are ready, the ready indicator 52(0)(a) may be provided as "1110." Analogously, if two of the instructions 43(0)-43(7) are ready, the ready indicator 52(0)(a) may be provided as "1100." If one of the instructions 43(0)-43(7) are ready, the ready indicator 52(0)(a) may be provided as "1000." Finally, if none of the instructions 43(0)-43(7) are ready, the ready indicator 52(0)(a) may be provided as "0000."

The address sets 52(0)(b)-52(3)(b) are sets of sorted addresses. Each address in the address set 52(0)(b)-52(3)(b) is for an instruction 43 of the group of instructions 43(0)-43(7), 43(8)-43(15), 43(16)-43(23), 43(24)-43(32) that are ready for execution and have the highest instruction execution priority among the group of instructions 43(0)-43(7), 43(8)-43(15), 43(16)-43(23), 43(24)-43(32). The address are three bits and have been sorted so that the addresses for instructions 43 from the group of instructions 43(0)-43(7), 43(8)-43(15), 43(16)-43(23), 43(24)-43(32) that are ready for execution are found at the top. In this embodiment, four addresses are provided by each group block 50 in each of the address sets 52(0)(b)-52(3)(b).

Each group output 52 is then received by the global instruction block 54. In this embodiment, the global instruction block 54 includes a one-hot converter circuit 66, an issue counter 68, a select generator 70, an output multiplexer 72, and a decoder 74. The one-hot converter circuit 66 is configured to receive the ready indicator 52(0)(a)-52(3)(a) of the group outputs 52 and convert the ready indicator 52(0)(a)-52(3)(a) into a one-hot output that indicates the number of the instructions 43 that are ready for execution. The one-hot outputs are provided in a 20-bit word 76 to the issue counter 68 and the select generator 70. The select generator generates an address select output 78 for the output multiplexer 72 and a block selects 80 for the decoder 74. The output multiplexer 72 is configured to receive the address set 52(0)(b)-52(3)(b) of each group block 50 and the address select output 78 from the select generator 70. The output multiplexer 72 selects an issue set 82 from the address sets 52(0)(b)-52(3)(b) based on the address select output 78. The issue set 82 indicates four addresses from the address sets 52(0)(b)-52(3)(b) for four instructions 43 to be issued.

In this embodiment, the four highest priority 3-bit addresses are selected by the output multiplexer 72 based on the address select output 78 and provided to the decoder 74. The issue counter 68 receives the one-hot outputs as the 20-bit word 76 and generates a one-hot indicator 84 that indicates the total number of instructions 43 to issue based on the one-hot outputs. The decoder 74 receives the issue set 82 from the output multiplexer 72, the one-hot indicator 84 from the issue counter 68, and the address select output 80 from the select generator 70. To generate the global grant output 56, the decoder 74 is then configured to decode the issue set 82 in accordance with the one-hot indicator 84. The global grant output 56 indicates the global set of the plurality of instructions 43 having the highest instruction execution priority among the plurality of instructions 43 in the instruction queue 42 that are ready for execution. The global grant output 56 can then be provided to the execution component 34 (shown in FIG. 1) which obtains the appropriate instructions 43 from the instruction queue 42 based on the global grant output 56.

In this embodiment, the global grant output 56 is also provided to the update block 60. As explained in further detail below, the update block 60 can be a shifter configured to generate the update output 62 as a plurality of one-hot outputs. Each one-hot output in the update output 62 indicates in which queue entry 44 the residual set of the instructions 43 is to be stored once the global set of the instructions 43 are issued for execution in response to the global grant output 56. For example, if instruction 43(0) is issued but not instruction 43(1), then the one-hot output for queue entry 44(0) should indicate that instruction 43(1) in queue entry 44(1) should be moved up to queue entry 44(0). In this manner, the instruction execution priority of the instructions 43 in the instruction queue 42 is maintained. The one-hot outputs in the update output 62 are then provided to the instruction queue 42.

Figure 4A:
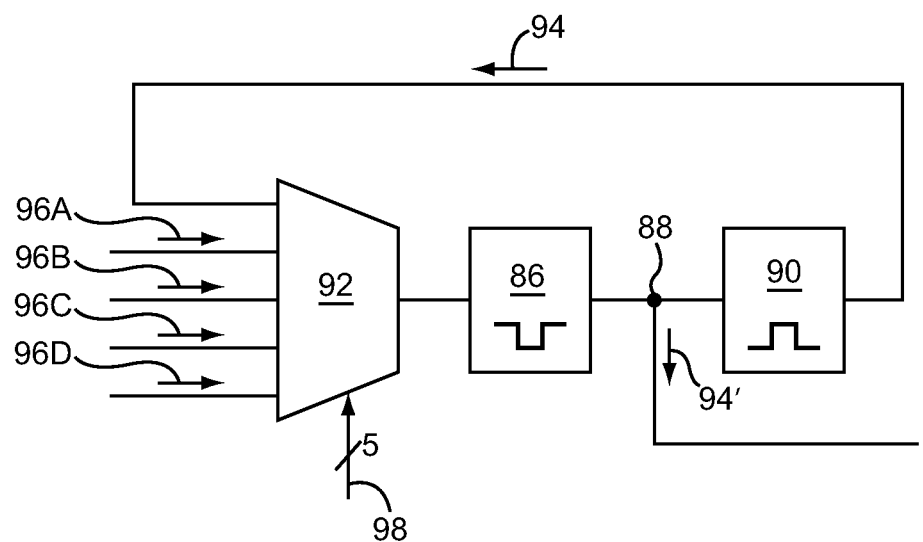
FIG. 4A illustrates one embodiment of latches used to store a bit within a queue entry of the instruction queue and a wakeup multiplexer for updating the bit when the instruction queue is being compacted.
Figure 4B:
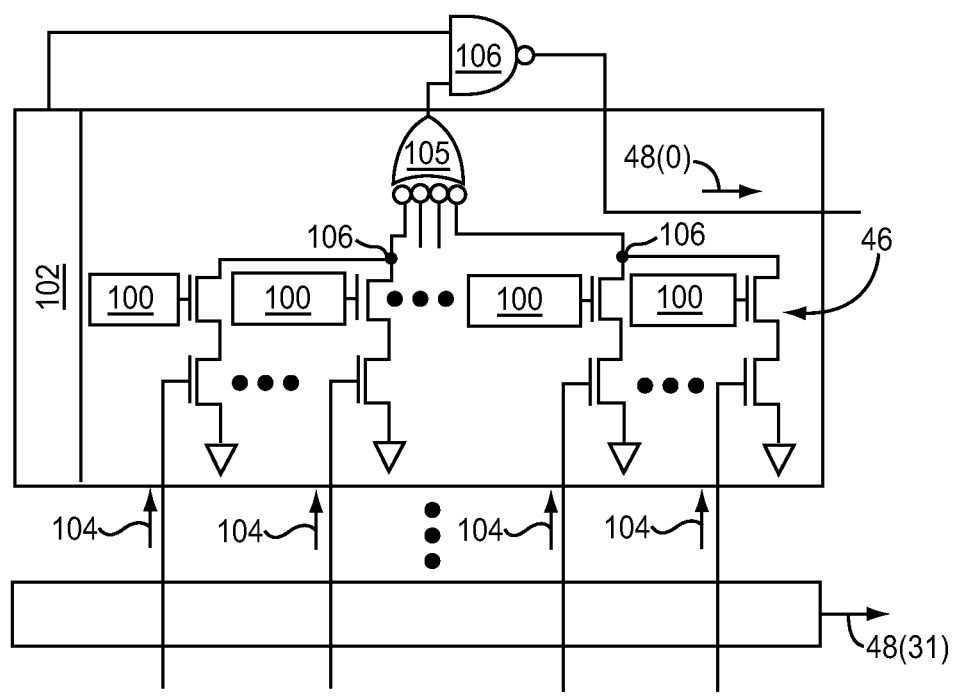
FIG. 4B illustrates one embodiment of an ready generation circuit for the instruction issue circuit shown in FIG. 3.

FIG. 4A and FIG. 4B illustrates exemplary circuits that may be utilized to provide the instruction queue 42. In this example, the instruction queue 42 is provided as a register scoreboard. FIG. 4A illustrate wakeup logic of the register scoreboard that stores and updates a single bit within one of the queue entries 44. A row of similar circuits are used to store and update the remaining bits of the queue entry 44. Multiple rows of these circuits are used to provide multiple queue entries 44.

The register scoreboard uses dynamic logic to track instruction dependencies and generate the ready signals 48. To satisfy the domino input monotonicity condition, the scoreboard flip-flop is split, with a master latch 86 driving a domino node 88 and a slave latch 90 updating in parallel. A wakeup multiplexer 92 corresponds to a bit 94 for a corresponding one of the queue entries 44 but receives other bits (referred to generically as elements 96 and specifically as elements 96A-96D) from more than one of the plurality of instructions 43. For instance, the other bit 96A may be the bit from the row below the queue entry 44 but in the same column as bit 94. The other bit 96B may be the bit from the queue entry 44 two rows below but in the same column as bit 94. The other bit 96C may be the bit from the three rows below but in the same column as bit 94. The other bit 96D may be the bit from four rows but in the same column as bit 94.

A one-hot output 98 from the update output 62 (shown in FIG. 3) serves as a selection input to the wakeup multiplexer 92 so that one of the other bits 96 is selected by the wakeup multiplexer 92 to update the queue entry 44. For example, if the one-hot output is "01000" then the other bit 96A one row below the queue entry 44 is used to update the queue entry 44. On the other hand, if the one-hot output is "00100" then the other bit 96B two rows below the queue entry 44 is used to update the queue entry 44. Analogously, if the one-hot output is "00010" then the other bit 96C three rows below the queue entry 44 is used to update the queue entry 44. If the one-hot output is "00001" then the other bit 96D four rows below the queue entry 44 is used to update the queue entry 44. Finally, if the one-hot output is "10000" then the bit 94 of the queue entry 44 is not updated. In this manner, instructions (shown in FIG. 3) can be moved up the instruction queue 42 so that the instruction queue 42 can be updated. The master latch 86 is transparent during the negative part of a clock cycle while the slave latch 90 is opaque. On the other hand, the slave latch 90 is transparent during the positive part of a clock cycle while the master latch 86 is opaque. As a result, output bit 94' does not reflect changes to the bit 94 too early.

FIG. 4B illustrates one embodiment of a circuit that may be utilized by the ready generation circuit 46. The ready generation circuit 46 shown in FIG. 4B corresponds to the portion of the ready generation circuit 46 for the queue entry 44(0). Other similar circuits are used for the portions related to the other queue entries 44 in the instruction queue 42. The portion of the ready generation circuit 46 shown in FIG. 4B generates the ready signal 48(0). Other portions generate the other ready signals 48(1)-48(31) for the other queue entries 44.

Each of the circuits 100 are circuits like the one illustrated in FIG. 4A. These circuits 100 each store a bit for a register field of the corresponding instruction 43(0) within the queue entry 44(0). There are sixty-four of these circuits 100 for the single register field. Another block 102 represents the same circuit except for another register field corresponding to the instruction 43(0). Each register field identifies a register so that a register value stored by the register is used as an operand of the instruction 43(0).

The ready generation circuit 46 is operably associated with the instruction queue 42 to generate the plurality of ready signals 48. The following explanation is provided with regard to the ready signal 48(0), but it should be noted that the explanation is equally applicable to the generation of the ready signals 48(1)-48(31). With respect to the queue entry 44(0), the ready generation circuit 46 receives the two register fields stored by the queue entry 44(0). The queue entry 44(0) stores two register fields that scoreboard sixty-four physical registers each. In this embodiment, the register fields have been fully decoded. Accordingly, the bit corresponding to the instruction's source operand register is set high.

Additionally, the ready generation circuit 46 receives register status signals 104. Each of the plurality of register status signals 104 indicates whether one of the sixty-four registers is available. The ready generation circuit 46 generates ready signals 48 by comparing the register fields with register status signals 104. To generate the ready signals 48, the thirty-two ready signals 48 are pre-charged. Furthermore, the register status signals 104 for ready registers are driven high while the others are driven low. These register status signals 104 are driven to the ready generation circuit 46 in response to the clock rising edge. If the instruction 43 utilizes one of the registers that is ready, one of the footless dynamic nodes discharge indicating that the source operand is ready. The inputs to a NOR gate 105 is split into four groups for 16 registers each to allow reliable dynamic node write-ability and high level retention on the high leakage target process. The resulting signal from the NOR gate 105 is fed to a NAND gate 106 along with the resulting signal from the block 102 for the register of the other operand. The ready signal 48 generated as a result indicates whether the instruction 43 stored by the queue entry 44 is ready for execution. In this manner, the ready generation circuit 46 is configured to generate the plurality of ready signals 48. For each of the ready signals 48, the ready generation circuit 46 generates the ready signal 48 so that the ready signal 48 corresponds to one of the queue entries 44. Furthermore, in response to the register status signal 104 indicating that the registers identified by the register fields of the instruction 43 are available, the ready signal 48 indicates that the instruction 43 stored by the queue entry 44 is ready for execution.

Figure 5A:
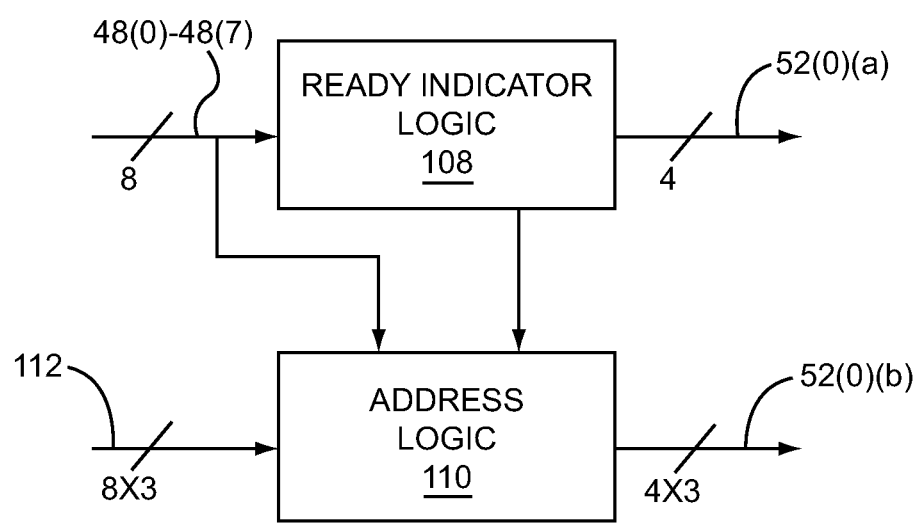
FIG. 5A illustrates one of the group blocks of the instruction issue circuit shown in FIG. 3, which is a sorter that includes ready indicator logic and address logic.

FIG. 5A illustrates a more detailed embodiment of the group block 50(0) implemented as an eight-entry sorter. It should be noted that the following discussion is equally applicable to the other group blocks 50(1)-50(3). The group block 50(0) shown in FIG. 5A includes ready indicator logic 108 to generate the ready indicator 52(0)(*a*) and address logic 110 to generate the address set 52(0)(*b*). Both the ready indicator logic 108 and the address logic 110 are configured to receive the ready signals 48(0)-48(7). The address logic 110 also receives eight 3-bit addresses 112 that correspond to the group of the instructions 43(0)-43(7) (shown in FIG. 3) stored by the group of queue entries 44(0)-44(7) (shown in FIG. 3). The ready indicator logic 108 generates the ready indicator 52(0)(*a*) that indicates the number of the instructions 43(0)-43(7) that are ready for execution. For example, if the ready signals 48(0)-48(7) are 01100101, the ready indicator may be output as 1111. The address logic 110 sorts the eight 3-bit addresses 112 based on the ready signals 48(0)-48(7). For instance, if the ready signals 48(0)-48(7) are 01100101, the address logic is the address set 52(0)(*b*) of the addresses from instructions 43(1), 43(2), 43(5), and 43(7) encoded in 3-bits.

Figure 5B:
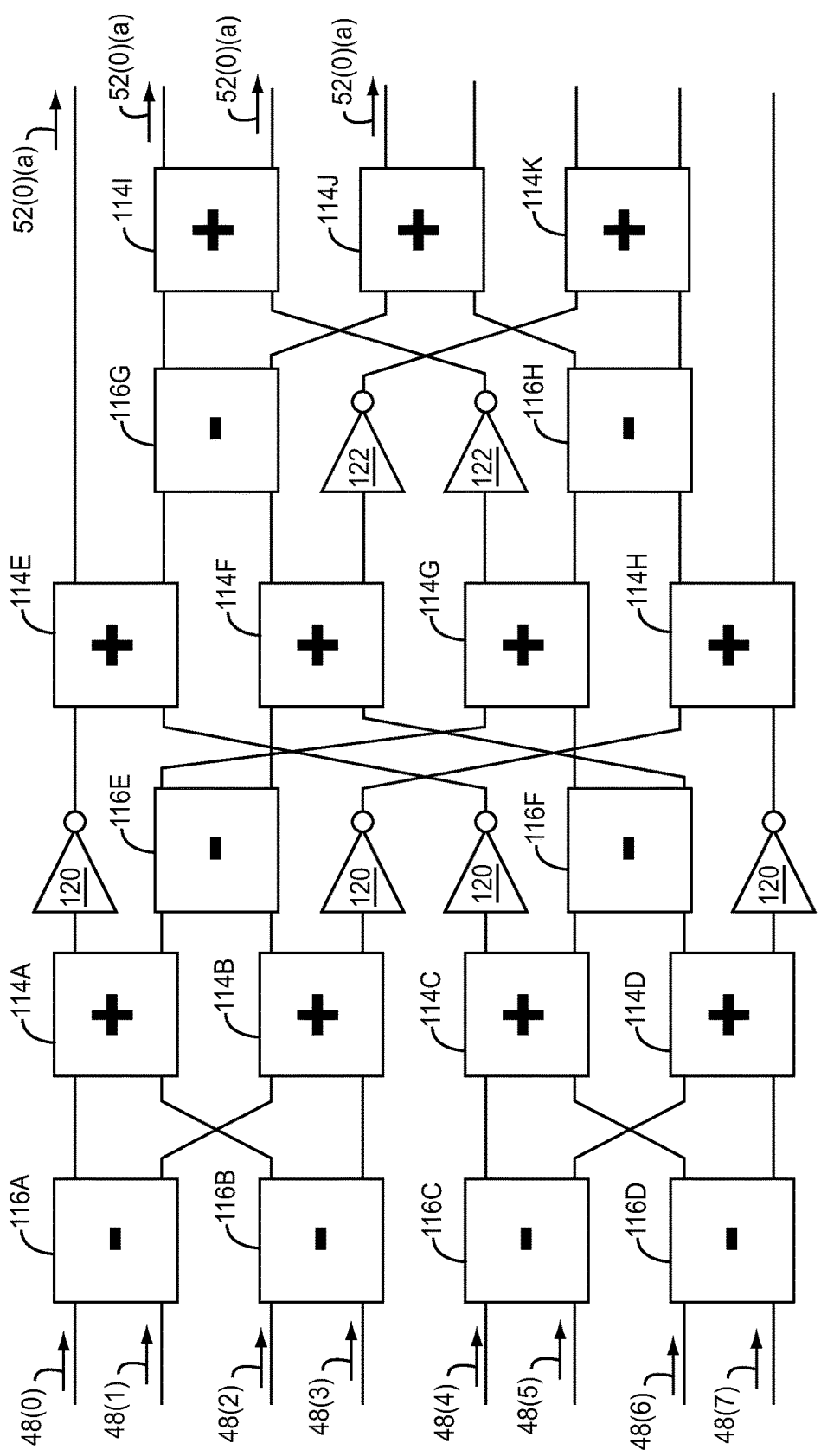
FIG. 5B illustrates a generalized arrangement of positive cells and negative cells that may be utilized by both the ready indicator logic and the address logic in FIG. 5A.

FIG. 5B illustrates one embodiment of an odd-even merge logic network that may be utilized by both the ready indicator logic 108 and the address logic 110. The ready indicator logic 108 and the address logic 110 uses 8-input odd-even merge sorters in parallel to sort the eight ready signals 48(0)-48(7) and/or the eight addresses 112 (shown in FIG. 5A) in-place based on logarithmic time. The following explanation is made with respect to the ready indicator logic 108 that sorts the ready signals 48(0)-48(7), however, it should be noted that the explanation is equally applicable to the address logic.

The logic has positive cells (referred to generically as elements 114 and specifically as elements 114A-114K) and negative cells (referred to generically as elements 116 and specifically as elements 116A-116H) that are labeled with a "+" and "−" to indicate that they are complementary cells. This reduces the number of inversion stages. With regards to the ready indicator logic 108, the negative cells 116 exchange the ready signals 48 if the top ready signal is a logical "1" and a bottom ready signal is a logical "0." For example, with regards to negative cell 116A, the negative cell 116A exchanges ready signals 48(0) and 48(1) at the output when the ready signal 48(0) is equal to a logical "1" and the ready signal 48(0) is a logical "0." In contrast, the positive cells 114 exchange their inputs when the top input is logical "0" and the bottom input is logical "1."

The positive cells 114 and the negative cells 116 are organized into stages. A first sort stage includes the negative cells 116A-116D. Each of these negative cells 116A-116D sorts the respective ready signals 48 at the inputs, as discussed above. After the first sort stage, a first merge stage is formed from positive cells 114A-114D, inverters 120, and negative cells 116E and 116F. A second sort stage is formed from positive cells 114E-114H. Finally, a second merge stage is formed by the negative cells 116G-116H, inverters 122, and positive cells 114I-114K. The net effect of the stages is for each logical "1" in the ready signals 48(0)-48(7) to be provided towards the top to generate the 4-bit ready indicator 52(0)(*a*). For example, if the ready signals 48(0)-48(7) are provided as "01001000", the ready indicator 52(0)(*a*) is generated as "1100." The ready indicator 52(0)(*a*) may be routed to the address busses by the select generator 70 to reduce the overall delay. This reduces fan-out in the six inversion paths.

Referring now to FIGS. 5A and 5B, the structure of the address logic 110 follows that of the ready indicator logic 108. As shown in FIG. 5B, the address logic 110 is separated to allow the 8-bit address logic 110 that drives the select generator 70 (shown in FIG. 3) to run ahead. Inverters are not required, as the address logic 110 moves the addresses 112 depending on the output of the ready indicator logic 108. The address set 52(0)(b) (shown in FIG. 5A) of the address logic 110 are generally the highest priority addresses within the addresses 112 (shown in FIG. 5A) that are ready for execution.

Figure 5C:
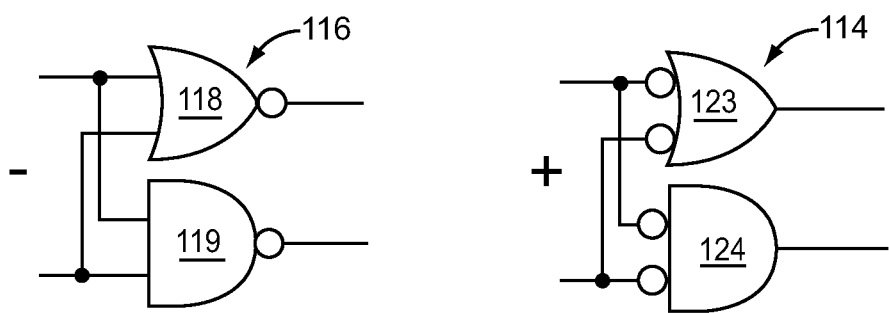
FIG. 5C illustrates embodiments of the positive and negative cells of the ready indicator logic.

FIG. 5C illustrates embodiments of the positive cells 114 and negative cells 116 of the ready indicator logic 108 (shown in FIG. 5A). The positive cells 114 exchange their inputs when the top input is logical "0" and the bottom input is logical "1." The logic of the negative cells 116 includes a NOR gate 118 and a NAND gate 119 in which the outputs are inverted by the respective gate 118, 119. Both the NOR gate 118 and the NAND gate 119 receive the same inputs. The logic of the positive cells 114 also includes a NOR gate 123 and a NAND gate 124 except that the inversion is provided at the inputs by the respective gate 123, 124.

Figure 5D:
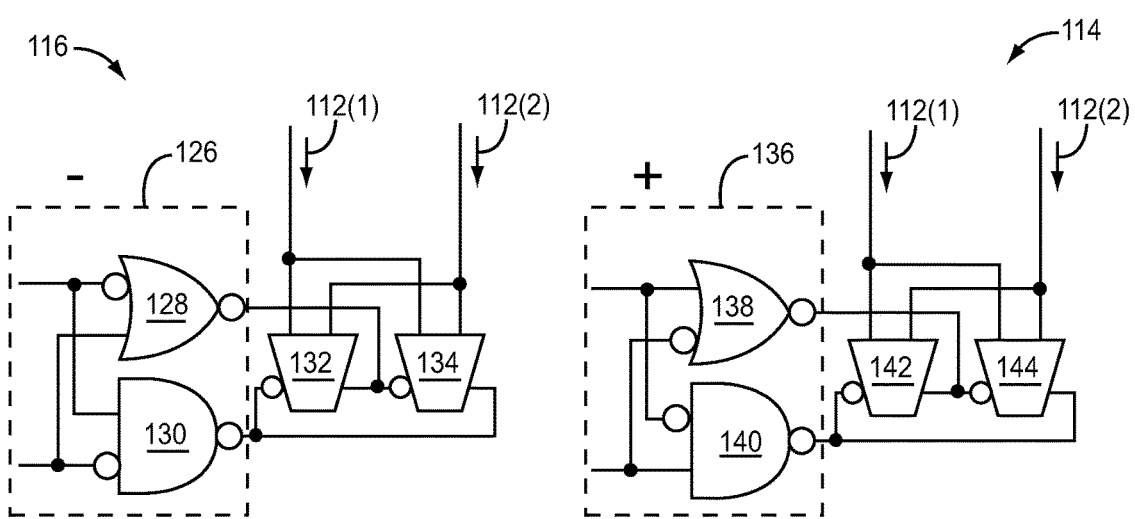
FIG. 5D illustrates embodiments of the positive and negative cells of the address logic.

FIG. 5D illustrates another embodiment of the positive cells 114 and the negative cells 116, which are for the address logic 110 (shown in FIG. 5A). The negative cells 116 include a first select logic 126 with a logic implication NOR gate 128 and a logic implication NAND gate 130. The first select logic 126 generates a select signal for a pair of multiplexers 132, 134. Each of the multiplexers 132, 134 receives a bit 112(1) and 112(2), respectively, from a pair of addresses. For the negative cells 116, the first select logic 126 generates the select signal. When the top input to the first select logic 126 is a logical "1" and the bottom input to the first select logic 126 is a logical "0," the bits 112(1) and 112(2) are exchanged as the output of the multiplexers 132, 134.

The positive cells 114 include second select logic 136 with a logic implication NOR gate 138 and a logic implication NAND gate 140. In this case, the inverted inputs of the logic implication NOR gate 138 and the logic implication NAND gate 140 are the opposite of the inverted inputs of the logic implication NOR gate 128 and the logic implication NAND gate 130 in the first select logic 126. The second select logic 136 generates a select signal for a pair of multiplexers 142, 144. Each of the multiplexers 142, 144 receives a bit 112(1) and 112(2), respectively, from a pair of addresses. For the positive cells 114, the second select logic 136 generates the select signal. When the top input to the second select logic 136 is a logical "0" and the bottom input to the second select logic 136 is a logical "1," the bits 112(1) and 112(2) are exchanged at the output of the multiplexers 142, 144. The positive cells 114 thereby implement the opposite exchange of the negative cells 116.

Figure 6:
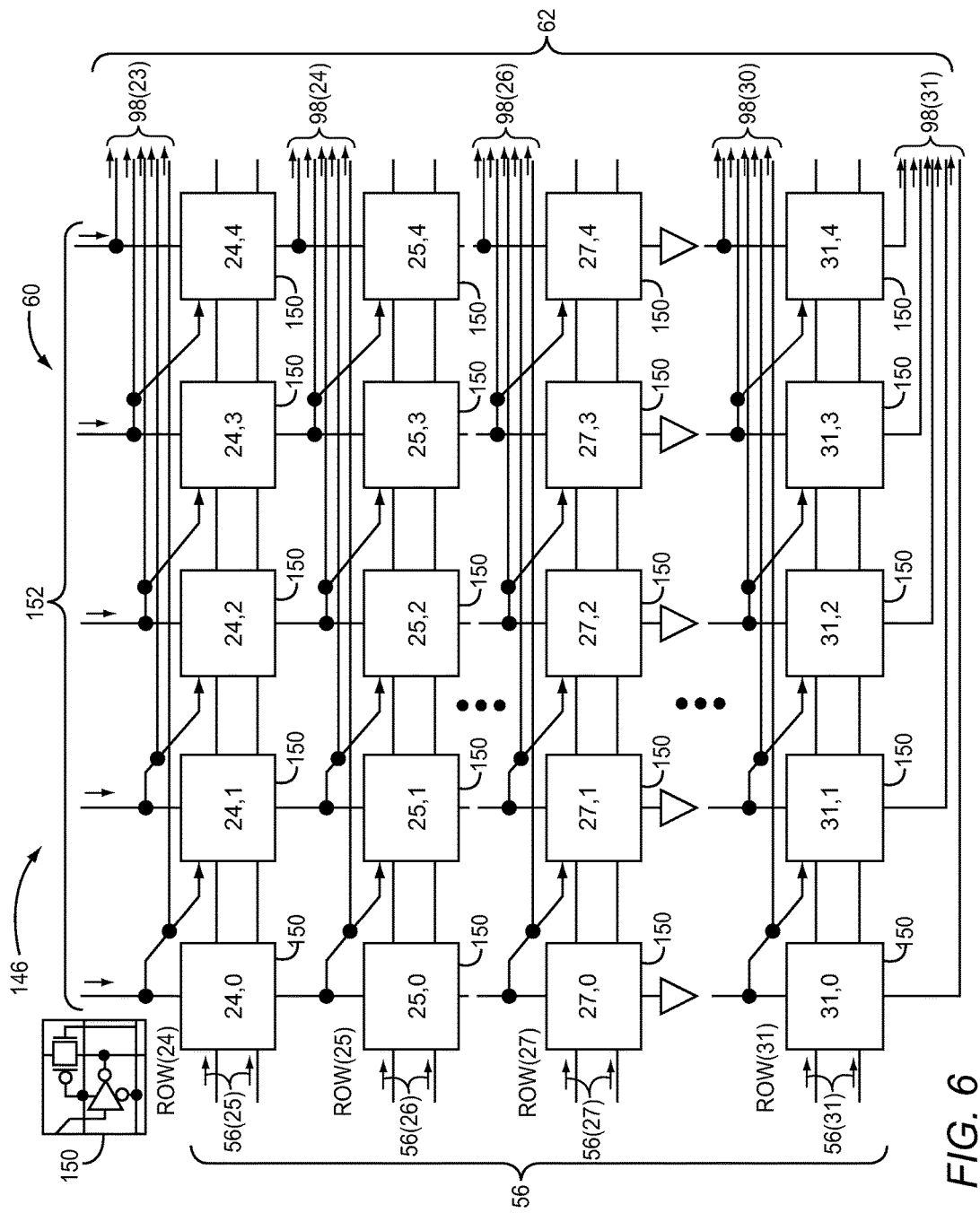
FIG. 6 illustrates one embodiment of an update block in the instruction issue circuit shown in FIG. 3, wherein the update block is implemented as a barrel shifter.

FIG. 6 illustrates a portion of one embodiment of the update block 60 shown in FIG. 3. The update block 60 is implemented as a shifter 146. As discussed above, the shifter 146 is configured to generate the update output 62, which in this case are a plurality of one-hot outputs 98 (referred to specifically as elements 98(0)-98(31)). The shifter 146 is organized into an array of tristate inverter cell with transmission gate (referred to generically as element 150 and specifically by row and column number). The shifter 146 includes four-barrel shifters; a first barrel shifter for the eight queue entries 44(0)-44(7) (shown in FIG. 3); a second barrel shifter for the eight queue entries 44(8)-44(15) (shown in FIG. 3); a third barrel shifter for eight queue entries 44(16)-44(23) (shown in FIG. 3); and, a fourth barrel shifter for the eight queue entries 44(24)-44(31). The shifter 146 has thirty-two rows (0-31) divided among four barrel shifters. For the sake of clarity, only row (24), row (25), row (27), and row (31) are specifically shown from the fourth barrel shifter.

In this example, the shifter 146 generates thirty-two one-hot outputs 98, which are each five bits a piece. Accordingly, the update output 62 is a five X thirty-two bit output. As discussed above, the update output 62 may be used by the wakeup multiplexers 92 (shown in FIG. 4A) to compact the queue after instructions have been issued on the next rising clock edge.

Each barrel shifter in the shifter 146 receives a 5-bit base indicator 152. The second barrel shifter for the eight queue entries 44(8)-44(15), the third barrel shifter for eight queue entries 44(16)-44(23) and the fourth barrel shifter for the eight queue entries 44(24)-44(31) each receive their particular base indicators 152 from the issue counter 68 (shown in FIG. 3). In contrast, the first barrel shifter for the queue entries 44(0)-44(7) receives its base indicator 152 with a one-hot starting value. The base indicator 152 has five bits 152(0)-152(4). A typical starting value of the base indicator 152 may thus be "10000." However, to reduce the number of inverter stages in the shifter 146 each column is inverted from that previous. Thus, the starting value of the base indicator 152 in this embodiment has the second bit 152(1) as a logical "1" and the fourth bit 152(3) as a logical "1." Accordingly, the starting value of the base indicator 152 for the first barrel shifter is provided as "11010."

The global grant output 56 is received as a plurality of differential grant bits (signals) 56(0)-56(31) from the decoder 74 (shown in FIG. 3). Each of the differential grant bits 56(0)-56(31) corresponds to and is received by one of the rows (0-31) of the shifter 146. The initial row [row (0), row(8), row(16), and row(24)] in each of the barrel shifters also receives the respective base indicator 152 for that barrel shifter. Row (0) of the first barrel shifter receives the starting value. On the other hand, row(8), row(16), and row(24) receive their base indicators 152 from the issue counter 68. For the current clock cycle, the issue counter 68 counts the number of issued instructions from the corresponding queue entries 44 of the barrel shifters above the particular barrel shifter. Thus, for the second barrel shifter, the base value of the base indicator 152 reflects the number of issued instructions from the queue entries 44(0)-44(7). With regard to the third barrel shifter, the base value of the base indicator 152 reflects the number of issued instructions from the queue entries 44(0)-44(15). Finally, for the fourth barrel shifter, the base value of the base indicator 152 reflects the number of issued instructions from the queue entries 44(0)-44(23). If the corresponding grant bit 56(0)-56(31) for an instruction 43 is a logical "0", the base values at the input are passed vertically to the next row without column shifting the base value of the base indicator 152. However, if the corresponding grant bit 56(0)-56(31) are 1, the base value is shifted over by one position to the right and then vertically.

Table 1 below illustrates one exemplary implementation of the logic of the shifter 146 and, in particular, the logic of the fourth barrel shifter shown in FIG. 6 that includes row(24)-row(31) of the shifter 146. More specifically, the table illustrates the one-hot outputs 98(24)-98(31) for each row(24)-row(31) of the shifter 146.

|  | Base Indicator bit 152(0) = 1 | Base Indicator bit 152(1) = 1 | Base Indicator bit (2) = 0 | Base Indicator bit (3) = 1 | Base Indicator bit (4) = 0 |
|---|---|---|---|---|---|
| Grant Bit 56 (24) = 0 | 1 | 0 | 1 | 0 | 0 |

-continued

|  | Base Indicator bit 152(0) = 1 | Base Indicator bit 152(1) = 1 | Base Indicator bit (2) = 0 | Base Indicator bit (3) = 1 | Base Indicator bit (4) = 0 |
|---|---|---|---|---|---|
| Grant Bit 56 (25) = 0 | 1 | 0 | 1 | 0 | 0 |
| Grant Bit 56 (26) = 0 | 1 | 0 | 1 | 0 | 0 |
| Grant Bit 56 (27) = 1 | 0 | 0 | 1 | 0 | 1 |
| Grant Bit 56 (28) = 0 | 0 | 0 | 1 | 0 | 1 |
| Grant Bit 56 (29) = 0 | 0 | 0 | 1 | 0 | 1 |
| Grant Bit 56 (30) = 0 | 0 | 0 | 1 | 0 | 1 |
| Grant Bit 56 (31) = 0 | 0 | 0 | 1 | 0 | 1 |

Assuming that the queue entries 44(0)-44(23) have three instructions for issuance, the base indicator 152 is received by the fourth barrel shifter as having the value "10100." The table also assumes that the differential grant bit 56(27) is a logical "1" because the instruction 43(27) in queue entry 44(27) has been issued. Since the grant bits (24)-(26) are each a logical "0", the base indicator bits 152(0)-152(4) are simply passed to the next row (25)-(27). At row (27) however, the grant bit (27) is a logical "0". In this case, the row (27) shifts and inverts the base value of "10100" one column to the right, which provides the one-hot output "00101." As grant bits (28)-(31) are each a logical "0," the base value is simply passed vertically as the output.

Each one-hot output 98 indicates in which of the plurality of queue entries 44 (shown in FIG. 3) the residual set of the plurality of instructions are to be stored. In this manner, the instruction execution priority of the residual set of instructions 43 is maintained once the global set of instructions 43 has been issued for execution. Each of these one-hot outputs 98 is provided to a row of the wakeup multiplexers 92 (shown in FIG. 4A) and serves as a selection input to the wakeup multiplexers 92 to update the queue entries 44.

Figure 7:
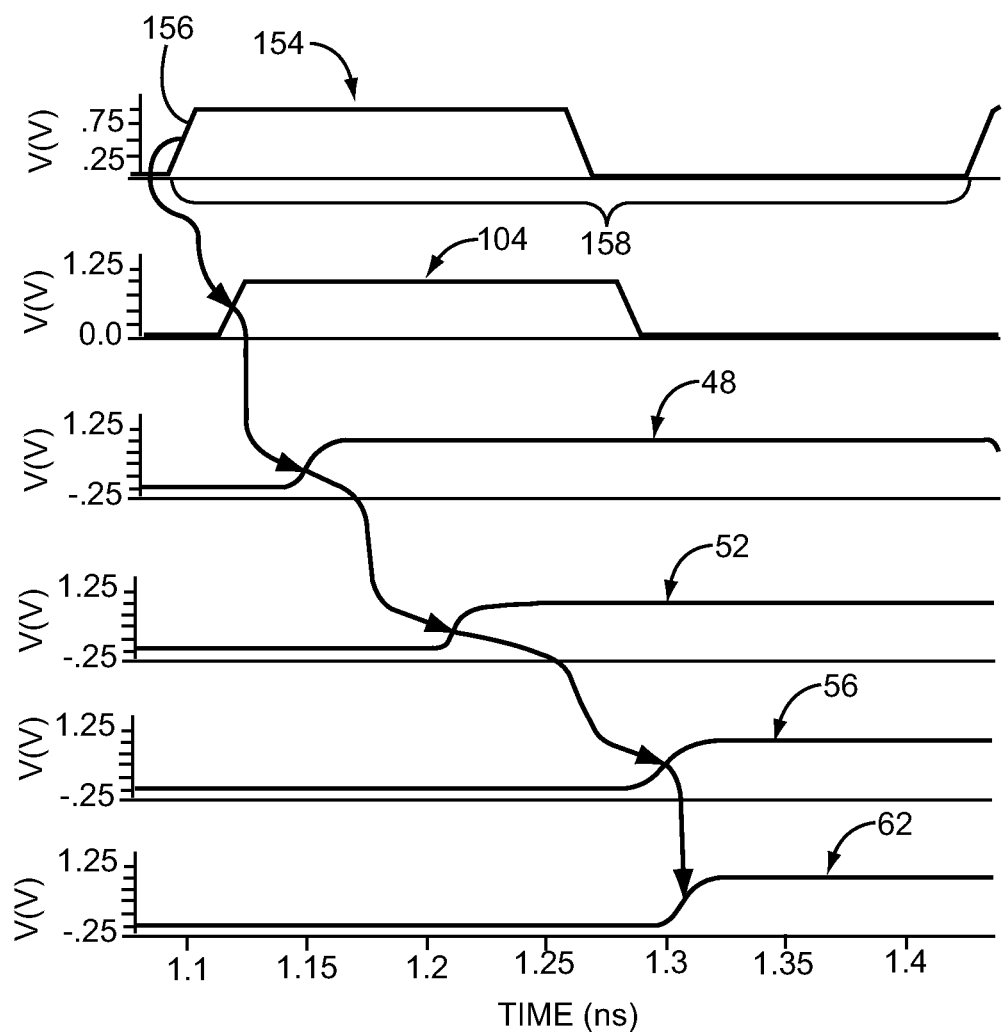
FIG. 7 illustrates one embodiment of a timing diagram for the instruction issue circuit shown in FIG. 3.

Referring now to FIGS. 3 and 7, FIG. 7 illustrates a timing diagram for exemplary procedures related to a method implemented by the instruction issue circuit 26 that is shown in FIG. 3. The instruction issue circuit 26 implements the exemplary procedures within the superscalar pipeline 10 shown in FIG. 1. One embodiment of a clock signal 154 is shown in FIG. 7, which is utilized to time the operation of the instruction issue circuit 26. At an activation edge 156 of the clock signal 154, the updating of the instruction queue 42 is performed by the wakeup multiplexers 92 (shown in FIG. 4A). The update output 62 that include the one-hot outputs 98 for a current clock cycle 158 of the clock signal 154 have been generated during the previous clock cycle. In this example, the activation edge 156 is a rising edge of the clock signal 154. Alternative embodiments may utilize a falling edge or both the rising edge and the falling edge as the activation edge 156.

Once these one-hot outputs 98 are received by the rows of the wakeup multiplexers 92, the queue entries 44 are updated with the residual set of instructions 43 from the previous clock cycle. Also, new instructions 43 may be received in the instruction queue 42 to replace the global set of instructions 43 issued during the previous clock cycle. As explained above, the instruction issue circuit 26 shown in FIG. 3 stores a plurality of instructions 43 in the instruction queue 42 so that the plurality of instructions 43 are ordered in accordance with an instruction execution priority. Generally, the oldest instructions 43 are stored toward the top of the instruction queue 42 while the newest instructions 43 are stored toward the bottom of the instruction queue 42.

Next, the thirty-two ready signals 48 are pre-charged. Furthermore, the register status signals 104 for ready registers are driven high while the others are driven low. These register status signals 104 are driven to the ready generation circuit 46 in response to the activation edge 156. If the instruction 43 utilizes one of the registers that is ready, footless dynamic nodes in the ready generation circuit 46 discharge indicating that source operands for instructions 43 are ready. The output of the domino drives the NAND gate 106 (shown in FIG. 4B) and generates the plurality of ready signals 48 at in response to the activation edge 156 of the clock signal 154. As discussed above, each of the ready signals 48 indicates whether a different corresponding instruction 43 in the instruction queue 42 is ready for execution instruction.

Subsequently, the instruction issue circuit 26 and, more specifically, the group blocks 50 generate the group outputs 52. In this example, the group blocks 50 are each sorters and the group outputs 52 include the ready indicators 52(0)(a)-52(3)(a) and the address sets 52(0)(b)-52(3)(b). The group outputs 52 are provided after about 207 ps after the activation edge 156. For each corresponding group output 52 of the plurality of group outputs 52, the corresponding group output is generated based on a group of the plurality of ready signals [either the ready signals 48(0)-48(7), the ready signals 48(8)-48(15), the ready signals 48(16)-48(23), or the ready signals 48(24)-48(31)] that corresponds with a different group of the plurality of instructions [either the instructions 43(0)-43(7), the instructions 43(8)-43(15), the instructions 43(16)-43(23), or the instructions 43(24)-43(31)].

In response to the group outputs 52, the global instruction block 54 generates the global grant output 56 based on the plurality of group outputs 52. The global grant output 56 indicates a global set of the plurality of instructions 43 having a highest instruction execution priority among the plurality of instructions 43 that are ready for execution. Utilizing the global grant output 56, the update block 60, which in this example is the shifter 146 (shown in FIG. 6), generates the update output 62. In this manner, the update output 62 is provided to compact the instruction queue 42 during the next clock cycle. Overall the instruction issue circuit 26 shown in FIG. 3 requires 30 inversion stages and has a delay of 292 ps with energy consumption of 3.98 pJ per cycle at 1V VDD.

The ready generation circuit 46 in FIG. 3, the group blocks 50 in FIG. 3, and the global instruction block 54 may be implemented using dynamic logic due to the large fan-in of the instruction queue 42 (register scoreboard) shown in FIG. 3. This results in a larger area being required to form the instruction issue circuit 26. Furthermore, the ready generation circuit 46 is dynamically discharged in each clock cycle and the high activity factor propagates to the group blocks 50 in FIG. 3, and the global instruction block 54, even when the group blocks 50 and global instruction block 54 are implemented with static circuitry.

Figure 8:
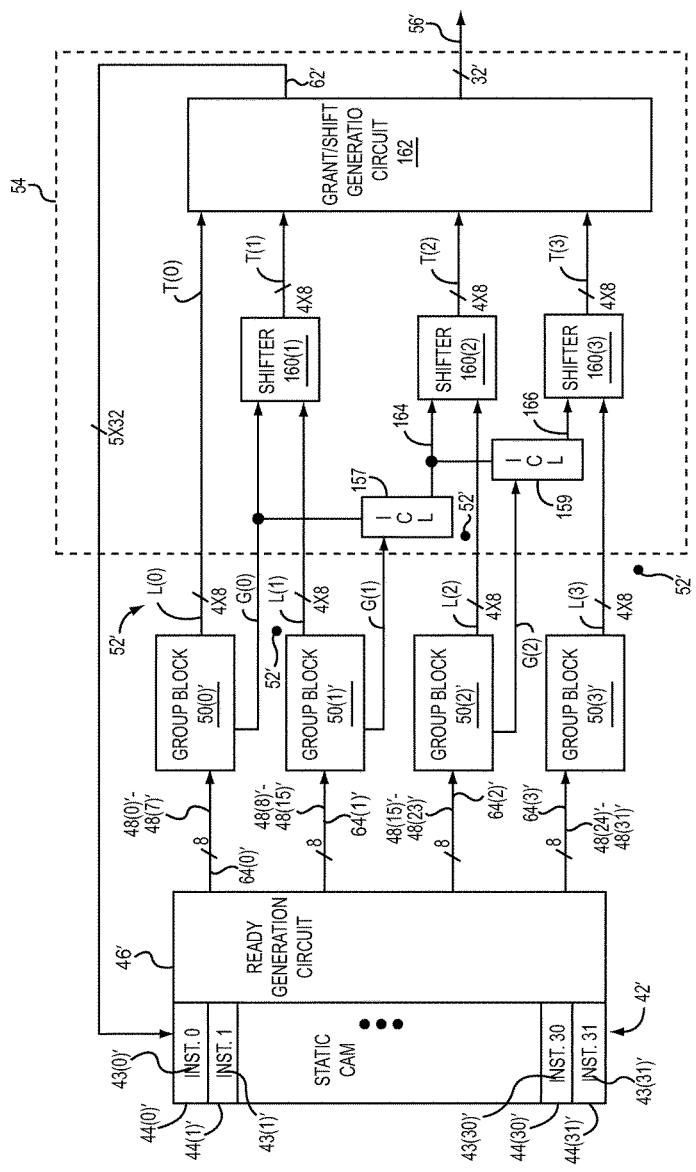
FIG. 8 illustrates another embodiment of the exemplary instruction issue circuit of FIG. 2 in which the instruction queue is content addressable memory (CAM) and the group blocks are shifters.

FIG. 8 illustrates another embodiment of an instruction issue circuit 26' shown in FIG. 2. The instruction issue circuit 26'shown in FIG. 8 is particularly advantageous when power consumption and the consumed area are of high concern in the desired application. In this embodiment, the instruction queue 42' is implemented as static content addressable memory (CAM). This static CAM arrangement is advantageous since the other logic circuitry of the instruction queue 42' can be implemented using static logic circuitry thereby reducing the power consumption and the area of the instruction issue circuit 26'.

The instruction queue 42' in FIG. 8 has queue entries 44(0)'-44(31)' to store up to thirty-two of the instructions 43'. More specifically, each of the queue entries 44(0)'-44(31)' store a corresponding one of the instructions 43(0)'-43(31)'. The ready generation circuit 46' generates ready signals 48' in response to an activation edge of the clock cycle based on the status of the instruction operands for the instructions 43'. If the registers with the instruction operands are both ready and valid for the particular instruction 43', the ready signals 48' that corresponds to the queue entry 44' and the stored instruction 43' is set to a logical "1." These ready signals 48' are split into groups (referred to generically as element 64' and specifically as elements 64(0'-64(3)') of eight. Thus, group 64(0)' includes ready signals 48(0)'-48(7)'. The group 64(0)' thus corresponds to queue entries 44(0)'-44(7)' and instructions 43(0)'-43(7)' within the instruction queue 42'. Analogously, group 64(1)' includes the ready signals 48(8)'-48(15)'. The group 64(1)' corresponds to queue entries 44(8)'-44(15)' and instructions 43(8)'-43(15)' within the instruction queue 42'. Furthermore, group 64(2)' includes ready signals 48(16)'-48(23)'. The group 64(2)' corresponds to queue entries 44(16)'-44(23)' and instructions 43(16)'-43(23)' within the instruction queue 42'. Finally, group 64(3)' includes ready signals 48(24)'-48(31)'. The group 64(3)' corresponds to queue entries 44(24)'-44(31)' and instructions 43(24)'-43(31)' within the instruction queue 42'.

Each group 64' is provided to one of the group blocks 50'. More specifically, the group 64(0)' is provided to the group block 50(0)', the group 64(1)' is provided to the group block 50(1)', the group 64(2)' is provided to the group block 50(2)', and the group 64(3)' is provided to the group block 50(3)'. The group blocks 50' process the group 64' of ready signals 48' in parallel. In this particular embodiment, the group blocks 50' are 8-entry shifters and each group block 50' generates one of the group outputs 52'

For each group output 52', the group output 52' is generated based on the corresponding group 64' of the ready signals 48' provided as input. Furthermore, each of the group outputs 52' indicates a group set within the different group of the plurality of instructions having a highest instruction execution priority among the group of the plurality of instructions 43' that are ready for execution. As mentioned above, the group blocks 50' of this embodiment are each shifters. The group output 52' from each group block 50' includes a group (referred to generically as L(x) and specifically as L(0)-L(3)) of one-hot outputs. Each of the groups L(x) corresponds to the corresponding group 64' of ready signals 48' provided as inputs. In this example, each one hot-output in the group L(x) is four bits and each group L(x) has eight one-hot outputs. Additionally, each of the eight one-hot outputs in the groups L(x) correspond to one of the instructions 43' and queue entries 44' of the instruction queue 42'. In particular, each one-hot output in the group L(x) indicates a number of ready signals 48' in the group 64' that are a logical "1" above the instruction 43' that corresponds to the one-hot output.

The following specific case is provided to clarify the functionality of the group blocks 50'. In this specific example, assume that the ready signals 48(1)', 48(2)', 48(8)', 48(11)' and 48(27)' corresponding to the instructions 43(1)', 43(2)', 43(8)', 43(11)' and 43(27)' stored in queue entries 44(1)', 44(2)', 44(8)', 44(11)' and 44(27)' are each a logical "1." Table II below is provided to illustrate the functionality of the group block 50(0)'.

TABLE II

| | One-Hot Outputs for Group L(0) | | | |
|---|---|---|---|---|
| Ready Signal 48(0) = 0 | 1 | 0 | 0 | 0 |
| Ready Signal 48(1) = 1 | 1 | 0 | 0 | 0 |
| Ready Signal 48(2) = 1 | 0 | 1 | 0 | 0 |
| Ready Signal 48(3) = 0 | 0 | 0 | 1 | 0 |
| Ready Signal 48(4) = 0 | 0 | 0 | 1 | 0 |
| Ready Signal 48(5) = 0 | 0 | 0 | 1 | 0 |
| Ready Signal 48(6) = 0 | 0 | 0 | 1 | 0 |
| Ready Signal 48(7) = 0 | 0 | 0 | 1 | 0 |

Thus, the one-hot output in group L(0) for instructions 43(0)' is provided as "1000" to indicate that no ready signals 48' in the group 64(0)', are a logical "1" above the queue entry 44(0)'. The same is true for the one-hot output in group L(0) for instruction 43(1)'. However, the one-hot output in group L(0) for instructions 43(2)' is provided as "0100" to indicate that the ready signals 48(1)' is a logical "1" in the group 64(0)' above the queue entry 44(2)'. The one-hot outputs in group L(0) for instructions 43(3)' to 43(7)' are provided as "0010" to indicate that two ready signals 48(1)', 48(2)' in the group 64(0)' are a logical "1" before them.

With regards to the one-hot outputs in group L(1), the one-hot output in group L(1) for instructions 43(8)' is provided as "1000" to indicate that no ready signals 48' in the group 64(1)', are a logical "1" above queue entry 44(8)'. The one-hot outputs in group L(1) for instructions 43(9)' to 43(10)' are also provided as "0010" to indicate that ready signal 48(8)' in the group 64(1)', is a logical "1" before the queue entries 44(9)' and 44(10)'. The same is true for the one-hot output in group L(1) for instruction 43(11)'. The one-hot outputs in the group L(1) for instructions 43(12)' to 43(15)' are provided as "0010" to indicate that the two ready signals 48(8)', 48(11)' in the group 64(1)' is a logical "1" before them. For the instructions 43(15)'-43(23)', none of the instructions are ready. Thus, each of the one-hot outputs in group L(2) is provided as "1000."

With regards to the one-hot outputs in group L(3), the one-hot outputs in group L(3) for instructions 43(24)'-43(27)' is provided as "1000" to indicate that no ready signals 48' in the group 64(3)', are a logical "1" above them. In contrast, the one-hot outputs in group L(3) for instructions 43(28)'-43(31) are each provided as "0100" to indicate that the ready signal 48(27) in the group L(3) is a logical "1" above them.

Referring again to FIG. 8, the group outputs 52' from the group blocks 50(0)', 50(1)', and 50(2)', also include other one-hot outputs (referred to generically as elements G(x) and specifically as elements G(0)-G(2)). In contrast, the group output 52' from the group block 50(3)' does not include the other one-hot output G(x). The other one-hot outputs G(x) indicate a total number of instructions 43' that are ready for execution in the group of instructions 43' that correspond to the group block 50(0)', 50(1)', and 50(2)'. Referring again to the specific example provided above, the other one-hot output G(0), is provided as "0010" because the instructions 43(1)' and 43(2)' are ready for execution within the group. The other one-hot output, G(1) is provided from the group block 50(1)' are provided as "0010" because the instructions 43(8)', 48(11)' are ready. Finally, the other one-hot output, G(2) is provided as "0010" because none of the instructions 43(15)'-48(23)' are ready.

The group block 50(0)' is the highest priority shifter since the group of instructions 43(0)'-43(7)' have the highest instruction execution priority. The group blocks 50(0)' is the highest priority shifter since the group of instructions 43(0)'-43(7)' have the highest instruction execution priority. The group block 50(1)' is a lower priority shifter than the group block 50(0)' but is a higher priority shifter than group blocks 50(2)', 50(3)' since the group of instructions 43(8)'-43(15)' have higher instruction execution priorities than instructions 43(16)'-43(31)'. Additionally, group block 50(2)' is a higher priority shifter than group block 50(3)', since the group of instructions 43(15)'-43(23)' have higher instruction execution priorities than instructions 43(24)'-43(31).' The group outputs 52(0)', 52(1)', and 52(2)' of the higher priority shifters include the other one-hot outputs G(x) but not the group output 52(3)' of the lowest priority shifter.

Each group output 52' is then received by a global instruction block 54'. The global instruction block 54' is configured to generate a global grant output 56' based on the group outputs 52'. The global grant output 56 indicates a global set of the plurality of instructions 43' having a highest instruction execution priority among the plurality of instructions 43' that are ready for execution in the instruction queue 42'. In this embodiment, the global instruction block 54' includes issue count logic (ICL) 157, 159, a second group of shifters (referred to generically as elements 160 and specifically as elements 160(1)-160(3)) and a grant/shift generation circuit 162. The grant/shift generation circuit 162 receives four groups (referred to generically as elements T(x) and specifically as elements T(0)-T(3)) of one-hot outputs. Each one-hot output from the groups T(x) indicates the total number of instructions 43' that are ready above the instruction 43' corresponding to the one-hot output.

The following equations express the overall calculation of the one-hot outputs in the groups T(x). It should be noted that the arithmetical calculations are performed through one-hot output arithmetic.

$$T(0)=L(0)$$

$$T(1)=G(0)+L(1)$$

$$T(2)=G(0)+G(1)+L(2)$$

$$T(3)=G(0)+G(1)+G(2)+L(3)$$

As such, the four bit X eight bit one-hot outputs in group T(0) are simply the four bit X eight bit group L(0) of one-hot outputs from the group block 50(0)'. With regard to the four bit X eight bit, the one-hot outputs in group T(1) are each the one-hot output in group L(1) plus the other one-hot output G(0). With regard to the four bit X eight bit group T(2), the one-hot output in group T(2) are each the one-hot output in group L(2) plus the other one-hot outputs G(0), G(1). With regards to the four bit by eight bit group T(3), the one-hot outputs in group T(3) are each the one-hot output in group L(3) plus the other one-hot outputs G(0), G(1), G(2).

Since the one-hot outputs in group T(0) are simply the one-hot outputs of the group L(0), no shifter 160 is required. To calculate the one-hot outputs of group T(2), the shifter 160(1) receives the one-hot outputs in group L(1) from the group block 50(1)' and the other one-hot output G(0) from the group block 50(0)'. The shifter 160(1) performs one-hot output arithmetic to add the one-hot outputs in group L(1) and the other one-hot output G(0) to generate the one-hot outputs in group T(1). Each of the one-hot outputs in the groups T(2) and T(3) are generated by the shifters 160(2), and 160(3), respectively, through one-hot output arithmetic. However, with regards to the one-hot outputs in the group T(2), the addition of the other one-hot outputs G(1) and G(2) is first calculated by the ICL 157. A one-hot output 164 indicating the addition of G(1) and G(2) is then fed from the ICL 157 into the shifter 160(2). The shifter 160(2) adds the one-hot output 164 to the one-hot outputs of group L(2) and generates the one-hot outputs in group T(2). To calculate the addition of G(1), G(2), and G(3), the one-hot output 164 from the ICL 157 is fed as an input to the ICL 159. The ICL 159 then adds the one-hot output 164 to the other one-hot output G(3) to generate a one-hot output 166. The shifter 160(3) adds the one-hot output 166 to the one-hot outputs of group L(3) and generates the one-hot outputs in group T(3).

As discussed above, the global grant output 56' is generated by the global instruction block 54'. The global grant output 56' is provided to the execution component 34 (shown in FIG. 1). In this example, the four highest priority instructions 43' in the instruction queue 42' that are ready for execution are issued. The global grant output 56' includes thirty-two grant signals, each representing a grant bit. The four of the grant bits corresponding to the four instructions 43' in the global set are provided as logical "1." The grant bits corresponding to the residual set of the instructions 43' that are not issued during the clock cycle are provided as logical "0."

In the illustrated embodiment, the grant/shift generation circuit 162 generates the global grant output 56' in accordance with the groups T(0)-T(3) of one-hot outputs. Essentially, the grant/shift generation circuit 162 sets the grant bit of the global grant output 56' as a logical "1" that correspond to the four instructions 43' having the highest instruction execution priority within the instruction queue 42'. In other words, the instruction 43' is granted if it is ready and the total number of instructions 43' ready for execution and the one-hot output in group T(3) that corresponds to the instruction 43' is less than four.

To compact the instruction queue 42', the global instruction block 54' also generates the update output 62'. The update output 62' indicates in which of the queue entries 44' each of a residual set of the instructions 43' is to be stored once the global set of the instructions 43' has been issued for execution to thereby maintain the instruction execution priority of the plurality of instructions 43'. In this example, the grant/shift generation circuit 162 generates the update output 62' based on the one-hot outputs in groups T(0)-T(3). The update output 62' includes thirty-two 5-bit one-hot outputs. In this manner, the instruction execution priority of the residual set is maintained once the global set has been issued.

Figure 9:
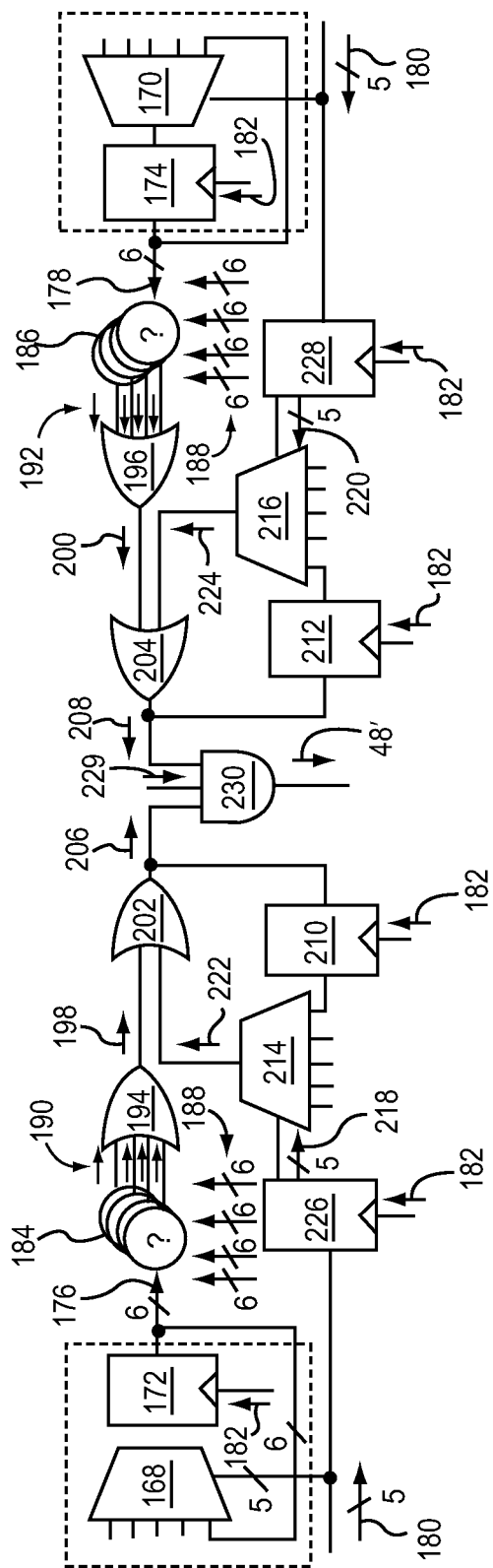
FIG. 9 illustrates one embodiment of latches that may be used to store bits within a queue entry of the instruction queue shown in FIG. 8 and a portion of a ready generation circuit operably associated with the queue entry.

Referring now to FIGS. 8 and 9, FIG. 9 illustrates one embodiment of the instruction queue 42' along with one embodiment of the ready generation circuit 46'. As discussed above, the instruction queue 42' is implemented using the static CAM. Similarly, the logic of the ready generation circuit 46' is also static. Wakeup multiplexers 168, 170 and latches 172, 174 that store bits for the queue entry 44' are separated from the logic of the ready generation circuit 46'. In this embodiment, each of the instructions 43' within the queue entries 44' has two register fields 176, 178. Each register field 176, 178 identifies a register so that a register value stored by the register is used as an operand of the instruction 43' stored in the queue entry 44'.

In this example, each register field 176, 178 have six bits. Accordingly, as shown in FIG. 1, each bit of the register field 176 of the instructions 43' is stored in one of six latches 172 while each bit of the register field 178 is stored in one of six latches 174. The six latches 172 receive inputs from one of the six wakeup multiplexers 168. The six latches 174 receive inputs from one of the six wakeup multiplexers 170. Similar to the wakeup multiplexer 92 shown in FIG. 4A, each of the wakeup multiplexers 168, 170 updates the latches 172, 174 in response to the activation edge of the clock signal based on one-hot outputs 180 of the update output 62'. The one-hot outputs 180 of the update output 62' arrive before the rising edge of the clock signal to update the queue entry 44'. Using standard binary representations, each register field is 6-bits wide to accommodate the same 64 registers. The encoded register fields lead to significant savings in area and power compared to the instruction issue circuit 26 shown in FIG. 3.

Static matching logic 184, 186 is configured to compare four 6-bit destination fields 188 to each of the register fields 176, 178 stored by the latches 172, 174. The destination fields 188 each identify registers that will be used to store a destination operand from the four instructions 43' issued for execution during the previous clock cycle. Each comparison of the register fields 176, 178 and the destination fields 188 is performed by the static matching logic 184, 186. The static matching logic 184, 186 determine if all six bits of the register fields 176, 178 match the six bits of each one of the destination fields 188. In one embodiment, the static matching logic 184, 186 includes networks of XNOR gates (not shown) fed to AND gates (not shown) to determine if all six bits match. In this manner, each of the static matching logics 184, 186 generate a 4-bit match output 190, 192, respectively. In this example, a bit of the match output 190, 192 is logical "1" for every destination field 188 that matched the respective register field 176, 178.

Each of the match outputs 190, 192 drive a 4-input OR gate 194, 196, respectively. Essentially, if any of the bits of the match output 190 is a logical "1", a match flag 198 generated by the OR gate 194 is a logical "1." Analogously, if any of the bits of the match output 192 is a logical "1", a match flag 200 generated by the OR gate 196 is a logical "1." The match flag 198 is received by an OR gate 202 while the match flag 200 is received by an OR gate 204. Each OR gate 202 and 204 generate a register field status signal 206, 208, respectively. The register field status signal 206 indicates whether the register identified by the register field 176 is ready. Analogously, the register field status signal 208 indicates whether the register identified by the register field 178 is ready. Note that each of the register field status signals 206, 208 are each fed back to one of the latches 210, 212, respectively. In this manner, a previous signal level of the register field status signals 206, 208 can be stored by the latches 210, 212, respectively. The previous signal level of the register field status signals 206, 208 are each provided from the latches 210, 212 as an input to multiplexers 214, 216. The multiplexers 214, 216 also have inputs from latches of other queue entries 44' below. The previous signal level of the appropriate register field status signal (including the previous signal level of the register field status signals 206, 208 or the previous signal level of the register field status signals from rows below) is selected by the multiplexers 214, 216 based on selection inputs 218 and 220, respectively. In this manner, the multiplexers 214, 216 each generate a previous register field status signal 222, 224, respectively.

The selection input 218, 220 received by each of the multiplexers 214, 216 is provided from latches 226, 228. Each of the latches 226, 228 receives the one-hot output 180 to provide each selection input 218, 220. However, for the multiplexers 214, 216 to propagate the previous register field status signal 222, the current one-hot output 180 should be set after the activating clock edge. Therefore, one-hot output 180 is delayed by the latches 226, 228 and thus the selection inputs 218, 220 are delayed versions of the one-hot output 180.

The register field status signal 206 generated by the OR gate 202 is set to a logical "1" if either the match flag 198 is a logical "1" and/or if the previous register field status signal 222 is a logical "1." Analogously, the register field status signal 208 generated by the OR gate 204 is set to a logical "1" if either the match flag 200 is a logical "1" and/or if the previous register field status signal 224 is a logical "1." The register field status signals 206, 208 and a valid bit 229 are each provided as inputs to an AND gate 230. If the register field status signal 206, register field status signal 208, and the valid bit 229 are all logical "1", the ready signal 48' for the instruction 43' in the queue entry 44' is set to logical "1." In this manner, the ready signal 48' indicates that the instruction 43' in the queue entry 44' is ready for execution.

Figure 10:
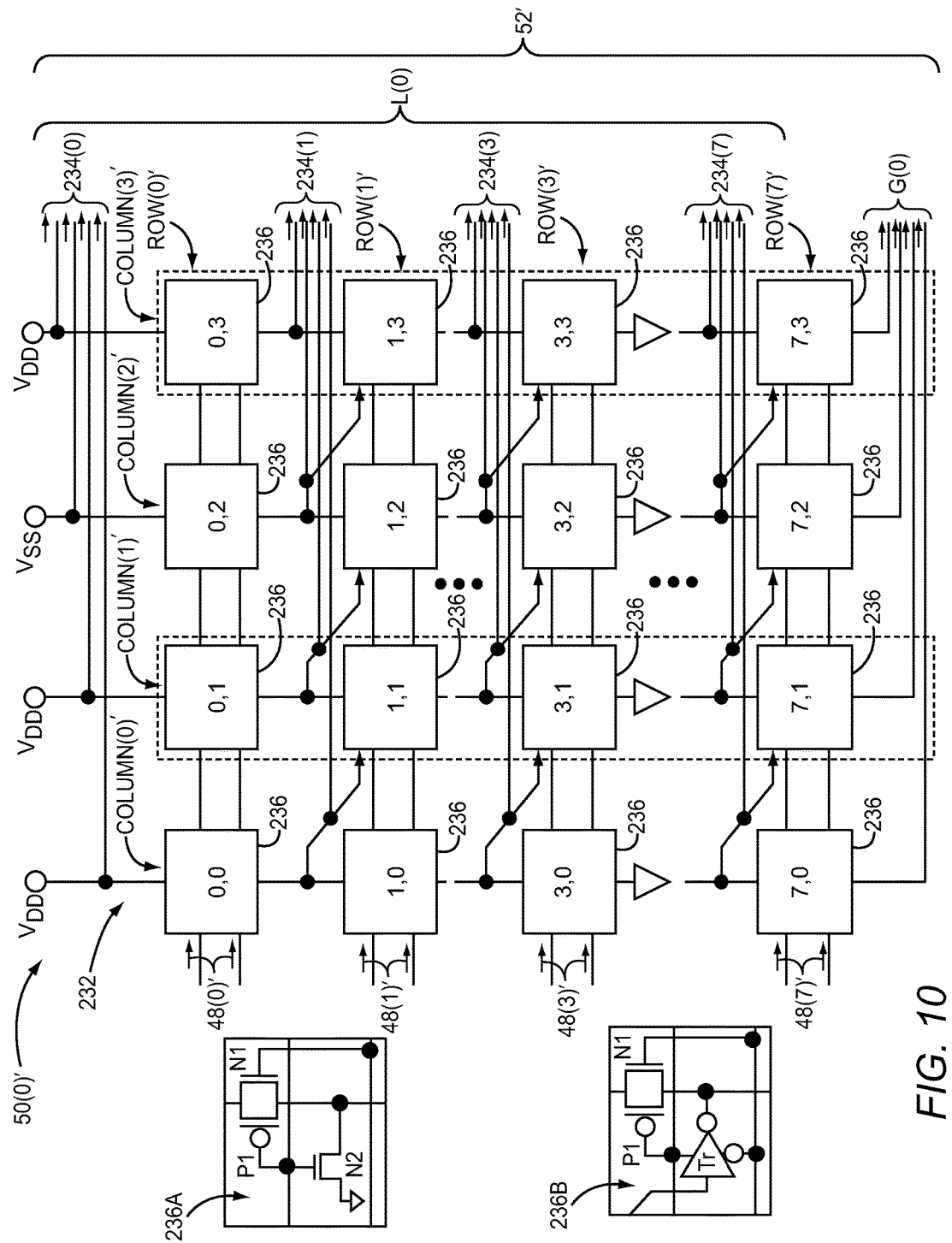
FIG. 10 illustrates an embodiment of one of the group blocks shown in FIG. 8, which in this case is a shifter.

FIG. 10 illustrates one embodiment of the group block 50(0) shown in FIG. 8. However, it should be noted that the following discussion with respect to FIG. 10 is equally applicable to the other group blocks 50(1)-50(3) in FIG. 8. The group block 50(0) of FIG. 10 is implemented as a shifter 232. More specifically, the shifter 232 is a barrel shifter.

In a four-issue scheme, a total of four instructions are issued per clock cycle. The shifter 232 is used to determine the number of corresponding instructions 43(0)'-43(7)' that are ready for execution. Accordingly, the corresponding ready signals 48(0)'-48(7)' are received by the shifter 232 as differential signals. The shifter 232 generates the group output 52' based on the ready signals 48(0)'-48(7)'. As discussed above, the group output 52' from group block 50(0)' includes the group L(0) of one-hot outputs (referred to generically as elements 234 and specifically as elements 234(0)-234(7)) and the other one-hot output G(0).

The shifter 232 is organized into an array of tristate inverter cells with transmission gates (referred to generically as element 236 and specifically by row and column number). These shifter cells 236 have two designs. In particular, shifter cells [0,0], [1,0], [2,0], and [3,0] in column (0)' are configured like the tristate inverter cell with transmission gate 236A. In contrast, the shifter cells 236 in column (1)', column (2)', and column (3)' are configured like the tristate inverter cell with transmission gate 236B. Column (1)' and column (3)' have been highlighted because the shifter cells 236 in column (1)' and column (3)' implement inverted logic. This reduces the number of inversion stages by a factor of two. However, the shifter 232 does not generate the one-hot outputs 234 as shown Table II. Rather, Table III demonstrates the operation of the shifter 232.

TABLE III

| N/A | 1 | 1 | 0 | 1 | One-Hot Outputs |
|---|---|---|---|---|---|
| Ready Signal 48(0)' = 0 | 1 | 1 | 0 | 1 | 234 in group L(0) |
| Ready Signal 48(1)' = 0 | 1 | 1 | 0 | 1 | |
| Ready Signal 48(2)' = 1 | 0 | 0 | 0 | 1 | |
| Ready Signal 48(3)' = 0 | 0 | 0 | 0 | 1 | |
| Ready Signal 48(4)' = 1 | 0 | 1 | 1 | 1 | |
| Ready Signal 48(5)' = 1 | 0 | 1 | 0 | 0 | |
| Ready Signal 48(6)' = 0 | 0 | 1 | 0 | 0 | |
| Ready Signal 48(7)' = 0 | 0 | 1 | 0 | 0 | G(0) |

In FIG. 10, a voltage VDD is the voltage of a logical "1." The voltage VDD may be the voltage of a supply voltage. On the other hand, a voltage VSS is the voltage of a logical "0." This voltage may be ground. In other embodiments, VSS may be equal to −VDD for certain implementations involving differential circuits. Accordingly, the starting base value received by row(0)' can be represented as "1101." The one-hot output 234(0) in group L(0) is provided as the starting base value because instruction 43(0)' is the first instruction and thus no other instruction could be ready before it. Assuming that the instructions 43(2)', 43(4)' and 43(5)' are ready for execution, the shifter 232 provides the one-hot outputs 234 in group L(0) as shown in Table III. In essence, when the ready signal 48' is a logical "0," the bits are simply passed vertically to the next row'. On the other hand, if the ready signal 48' is a logical "1," the bits are shifted over one column' and passed vertically to the next row. However, note that when shifting over one column' to the next row' the bits are inverted.

Figure 11:
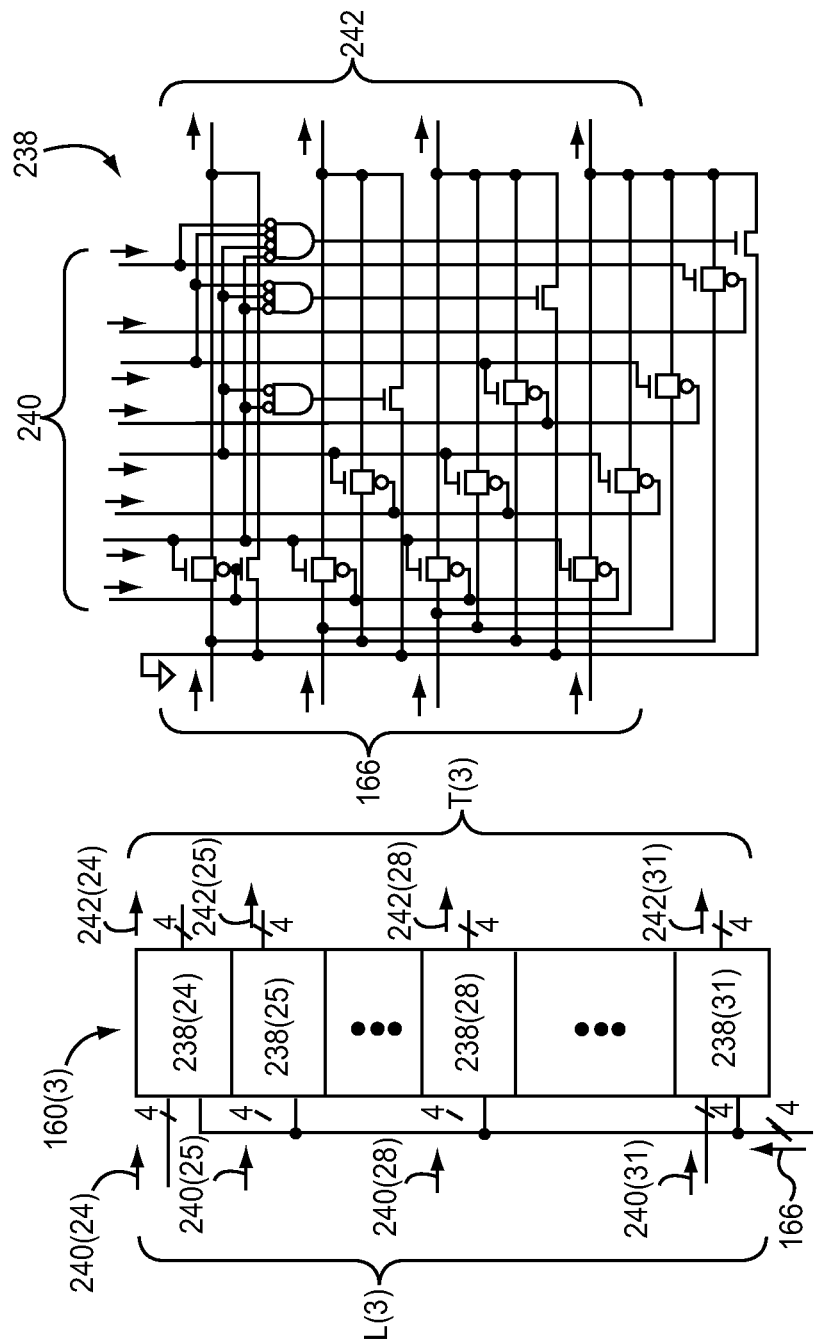
FIG. 11 illustrates one embodiment of another shifter used in a global instruction block shown in FIG. 8.

FIG. 11 illustrates one embodiment of the shifter 160(3) shown in FIG. 8. While FIG. 11 specifically shows the shifter 160(3), it should be noted that the following explanation is equally applicable to the shifter 160(1) and the shifter 160(2) in FIG. 8. The shifter 160(3) is implemented as a stack of multiplexer cells (referred to generically as elements 238 and specifically as elements 238(24)-238(31)). Each of the multiplexer cells 238 receive the one-hot output 166 from the ICL 159 (shown in FIG. 8). Note that the shifter 160(2) (shown in FIG. 8) would receive the one-hot output 164 (shown in FIG. 8) from the ICL 157 (shown in FIG. 8). The shifter 160(1) (shown in FIG. 8) would receive the other one-hot output G(0) (shown in FIG. 8) from the group block 50(0)' (shown in FIG. 8).

In FIG. 11, the multiplexer cells 238 each receive a corresponding one of the one-hot outputs (referred to generically as elements 240 and specifically as elements 240(24)-240(31)) in group L(3). In this embodiment, each bit of the one-hot outputs 240 may be received by the multiplexer cell 238 as a differential input. The one-hot output 240 is used as a select input in the multiplexer cell 238. The logic may be implemented using CMOS transmission gates to reduce the total number of inversions. Based on the corresponding one-hot output 240 in group L(3) and the one-hot output 166, each of the multiplexer cells 238 generates a corresponding one of the one-hot outputs (referred to generically as elements 242 and specifically as elements 242(24)-242(31)) in group T(3). To ensure that the one-hot output 242 from the multiplexer cell 238 is always driven, AND gates are used to drive NMOS transistors. When one of the NMOS transistors is turned on, the NMOS transistor pulls one of the bits to ground.

Figure 12:
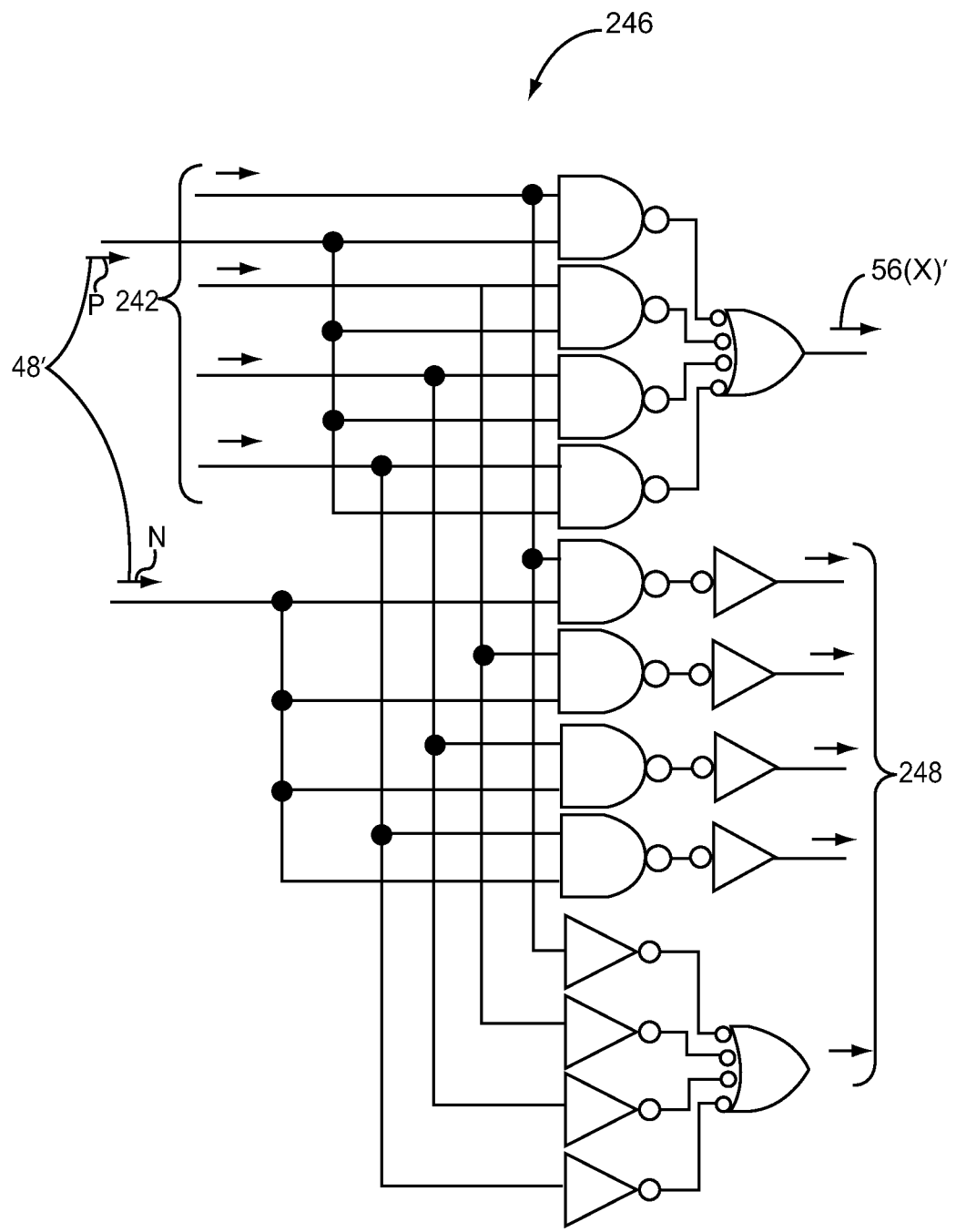
FIG. 12 illustrates a logic cell in a grant/shift generation circuit shown in FIG. 8 that generates a grant bit and a one-hot output for a corresponding queue entry.

FIG. 12 illustrates one embodiment of a logic cell 246 of the grant/shift generation circuit 162 shown in FIG. 8. For the purpose of explanation, it is presumed that the logic cell 246 receives one of the one-hot outputs 242 in the group T(3) from the shifter 160(3) illustrated in FIG. 11. However, the grant/shift generation circuit 162 in FIG. 8 may include thirty-two of the logic cells 246 in FIG. 12 stacked in parallel to process each of the one-hot outputs in the groups T(0)-T(3).

Referring now to FIGS. 8 and 12, the logic cell 246 also receives a corresponding one of the ready signals 48' as a differential input. The "P" in FIG. 12 indicates the positive polarity of the ready signal 48' while the "N" in FIG. 12 indicates the negative polarity of the ready signal 48'. If the instruction 43' in the queue entry 44' is ready and the one-hot output 242 indicates that less than three instructions 43' are ready in the other queue entries 44' above, the grant bit 56(x)' of the global grant output 56' is set to a logical "1." If the one-hot output 242 indicates that more than three instructions 43' in the queue entries 44' above are ready or if the ready signal 48' is a logical "0," then the grant bit 56(x)' is set to logical "0."

The logic cell 246 also generates one of the one-hot outputs 248 in the update output 62'. If the instruction 43' in the corresponding queue entry is to be granted, all of the bits in the one-hot output 248 are provided as a logical "0." When the instruction 43' is not issued, the instruction 43' is to be moved up a number of queue entries 44' within the instruction queue 42'. In this case, the number of queue entries 44' that the non-issued instruction 43' should be moved up is equal to the number of instructions 43 granted before it. This number is indicated by the one-hot output 242 in group T(3) and the one-hot outputs in the other groups T(0)-T(2). The ready signal 48' is ANDed with the bits of the one-hot output 242 to generate the one-hot output 248 in the update output 62'. Note that the one-hot output 248 is five-bits unlike the one-hot output 242 which is four bits. This fifth bit allows the one-hot output 248 to indicate that the non-issued instruction 43' should be move up four queue entries 44' in the instruction queue 42'.

Figure 13:
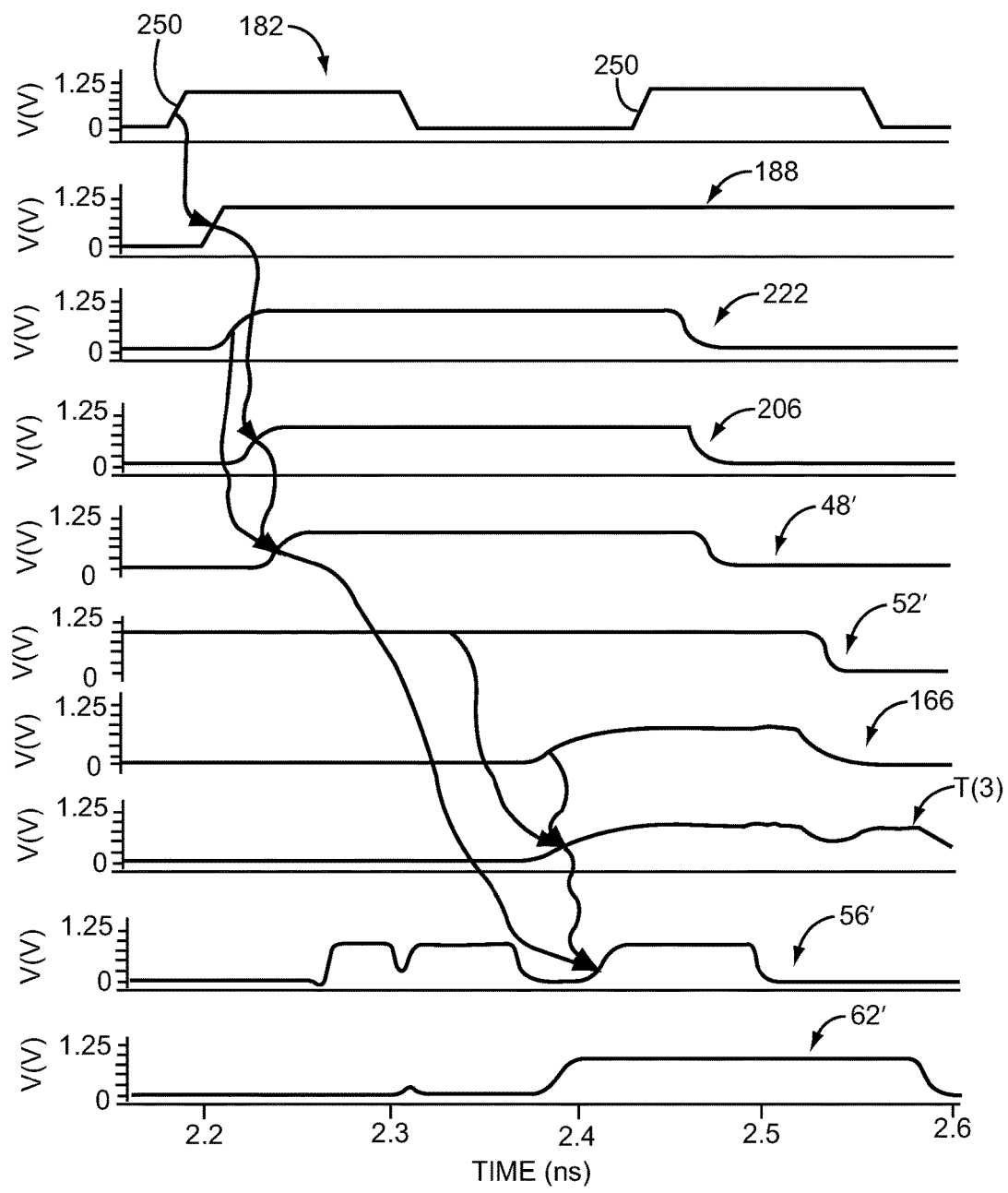
FIG. 13 illustrate an exemplary timing diagram for the instruction issue circuit shown in FIG. 8.

Referring now to FIG. 8, FIG. 9, and FIG. 13, FIG. 13 shows a timing diagram for a worst-case timing scenario with respect to the instruction issue circuit 26' shown in FIG. 8. The update output 62' to the wakeup multiplexers 168, 170 are setup 30 ps before rising edges 250 of the clock signal 182. In response, the instruction queue 42' is compacted in accordance with the update output 62'. After a two inversion delay of 18 ps, the destination fields 188, and the register fields 176, 178 are set up. In response, the static matching logic 184,186 and the OR gates 194, 196 generate the match flags 198, 200 after 24 ps (three inversions). As a result, the previous register field status signal 222 (and the previous register field status signal 224 that is not shown in FIG. 13) is set up followed by the register field status signal 206 (and the register field status signal 208 that is not shown in FIG. 13). The ready signals 48' are generated 56 ps after rising edge 250 of clock signal 182.

Due to the ready signals 48', the group outputs 52' are then generated from the group blocks 50'. After the group outputs 52', the ICL 157 generates the one-hot output 164 and then the ICL 159 can generate the one-hot output 166. The one-hot output 166 takes 151 ps to setup after the generation of ready signal 48' (worst case) and is fed to the shifters 160. The one-hot outputs in the groups T(x) (except for the group T(0), which is simply equal to the group L(0)) can be generated by the shifters 160. FIG. 13 illustrates the generation of the one-hot outputs in group T(3), which is the last of the groups T(x) to be generated 6 ps after the one-hot outputs 166 have been setup. The one-hot outputs in the groups T(x) drive the grant/shift generator circuit 162 to generate the global grant output 56' after 14 ps along with the update output 62'. In total, the global grant output 56' is generated 227 ps after the rising edge 250 of the clock signal 182 for the worst case scenario. Accordingly, the clock rate can be provided at more than a 4 GHz clock rate in a 45-nm process technology. Alternative embodiments may operate at different speeds.

Table IV below illustrates the performance of the instruction issue circuit 26 of FIG. 3 and the instruction issue circuit 26' of FIG. 8 in comparison with other designs.

| Design | Issue Width per queue | Maximum window size | Cycles per issue | Process node (nm) | Scaled Clock rate (GHz) | Clock rate (Hz) |
|---|---|---|---|---|---|---|
| 21264 | 2 | 20 | 1 | 350 | 4.8 | 600M |
| Intel CSG | 1 | 8 | 1 | 130 | 14.3 | 5G |
| IWB | 4 | 64 | 3 | 180 | 7.2 | 1.8G |
| Power4 | 1 | 12 | 1 | 180 | 5.2 | 1.3G |
| Instruction Issue Circuit 26 | 4 | 32 | 1 | 45 | 3.2 | 3.2G |
| Instruction Issue Circuit 26' | 4 | 32 | 1 | 45 | 4.1 | 4.1G |

As described above, the instruction issue circuit 26 and the instruction issue circuit 26' divide the ready signals into groups. By splitting the ready signals into groups and processing them in parallel, the complexity of issuing multiple instructions is reduced. Oldest-first priority selection is generally used and the update and select operations are completed in a single cycle ensuring high IPC. The select and update logic are implemented using static combinational logic that aides in borrowing time from the wakeup logic.

With regards to the instruction issue circuit 26 shown in FIG. 3, the high activity factor of the register scoreboards propagates to the static logic. Also, the domino logic of the resister scoreboard may require a more customized design. The instruction issue circuit 26' in FIG. 8 can be implemented entirely with static CMOS gates. This allows for the use of conventional timing tools for the timing analysis of the design. However, the use of sorters in the instruction issue circuit 26 greatly simplifies the selection of the four highest priority instructions and can be implemented using entirely parallel operations.

Those skilled in the art will recognize improvements and modifications to the preferred embodiments of the present disclosure. All such improvements and modifications are considered within the scope of the concepts disclosed herein and the claims that follow.

What is claimed is:

1. An instruction issue circuit, comprising:
an instruction queue operable to store a plurality of instructions so that the plurality of instructions are ordered in accordance with an instruction execution priority, wherein the instruction queue further comprises a plurality of queue entries operable to store the plurality of instructions, wherein each queue entry of the plurality of queue entries is configured to store a different corresponding instruction of the plurality of instructions so that each different corresponding instruction of the plurality of instructions includes one or more register fields, each of the one or more register fields identifies a register among a plurality of registers so that a register value stored by the register is used as an operand of the different corresponding instruction of the plurality of instructions;
a ready generation circuit operably associated with the instruction queue to generate a plurality of ready signals, wherein the ready generation circuit is configured to:
receive the one or more register fields stored by each of the plurality of queue entries;
receive a plurality of register status signals for the plurality of registers wherein each one of the plurality of register status signals indicates whether a different one of the plurality of registers is available; and
for each of the plurality of ready signals, generate a ready signal so that the ready signal corresponds to a different one of the plurality of queue entries and the ready signal indicates that the different corresponding instruction of the plurality of instructions stored by the different one of the plurality of queue entries is ready for execution in response to one or more corresponding register status signals of the plurality of register status signals indicating that the register identified by the one or more register fields of the different one of the plurality of queue entries is available, and wherein each ready signal of the plurality of ready signals indicates whether a different corresponding instruction of the plurality of instructions stored by the instruction queue is ready for execution;
a plurality of group blocks for generating a plurality of group outputs, each group block of the plurality of group blocks being operable to:
receive a different group of the plurality of ready signals that corresponds to a different group of the plurality of instructions;
generate a corresponding group output of the plurality of group outputs based on the different group of the plurality of ready signals, wherein the corresponding group output indicates a group set within the different group of the plurality of instructions having a highest instruction execution priority among the different group of the plurality of instructions that are ready for execution;
a global instruction block configured to:
receive the plurality of group outputs from the plurality of group blocks; and
generate a global grant output based on the plurality of group outputs, wherein the global grant output indicates a global set of the plurality of instructions having the highest instruction execution priority among the plurality of instructions that are ready for execution; and
a shifter that is configured to generate a plurality of one-hot outputs in response to the global grant output, wherein each one-hot output of the plurality of one-hot outputs indicates in which of the plurality of queue entries each of a residual set of the plurality of instructions is to be stored once the global set of the plurality of instructions has been issued for execution and thereby maintain the instruction execution priority of the plurality of instructions.

2. The instruction issue circuit of claim 1, wherein the instruction queue further comprises a plurality of multiplexers and wherein, for each multiplexer of the plurality of multiplexers:
the multiplexer corresponds to a bit for a corresponding one of the plurality of queue entries but receives other bits from more than one of the plurality of instructions; and
a corresponding one of the plurality of one-hot outputs serves as a selection input to the multiplexer so that one of the more than one other bits is selected by the multiplexer to update the corresponding one of the plurality of queue entries.

3. An instruction issue circuit comprising:
an instruction queue operable to store a plurality of instructions so that the plurality of instructions are ordered in accordance with an instruction execution priority, wherein the instruction queue further comprises a plurality of queue entries operable to store the plurality of instructions, wherein each queue entry of the plurality of queue entries is configured to store a different corresponding instruction of the plurality of instructions so that each different corresponding instruction of the plurality of instructions includes one or more register fields, each of the one or more register fields identifies a register among a plurality of registers so that a register value stored by the register is used as an operand of the different corresponding instruction of the plurality of instructions;

a ready generation circuit operably associated with the instruction queue to generate a plurality of ready signals, wherein the ready generation circuit is configured to:

receive the one or more register fields stored by each queue entry of the plurality of queue entries;

receive a plurality of register status signals for the plurality of registers wherein each one of the plurality of register status signals indicates whether a different one of the plurality of registers is available; and for each of the plurality of ready signals, generate a ready signal so that the ready signal corresponds to a different one of the plurality of queue entries and the ready signal indicates that the different corresponding instruction of the plurality of instructions stored by the different one of the plurality of queue entries is ready for execution in response to one or more corresponding register status signals of the plurality of register status signals indicating that the register identified by the one or more register fields of the different one of the plurality of queue entries is available, and wherein each ready signal of the plurality of ready signals indicates whether the different corresponding instruction of the plurality of instructions stored by the instruction queue is ready for execution;

a plurality of group blocks for generating a plurality of group outputs, each group block of the plurality of group blocks being operable to:

receive a different group of the plurality of ready signals that corresponds to a different group of the plurality of instructions;

generate a corresponding group output of the plurality of group outputs based on the different group of the plurality of ready signals, wherein the corresponding group output of the plurality of group outputs indicates a group set within the different group of the plurality of instructions having a highest instruction execution priority among the different group of the plurality of instructions that are ready for execution;

a global instruction block configured to:

receive the plurality of group outputs from the plurality of group blocks; and generate a global grant output based on the plurality of group outputs, wherein the global grant output indicates a global set of the plurality of instructions having the highest instruction execution priority among the plurality of instructions that are ready for execution; and an update block operably associated with the global instruction block and the plurality of queue entries, the update block being configured to generate an update output in response to the global grant output wherein the update output indicates in which of the plurality of queue entries each of a residual set of the plurality of instructions is to be stored once the global set of the plurality of instructions has been issued for execution and thereby maintain the instruction execution priority of the residual set once the global set has been issued.

4. An instruction issue circuit, comprising:

an instruction queue operable to store a plurality of instructions so that the plurality of instructions are ordered in accordance with an instruction execution priority;

a ready generation circuit operably associated with the instruction queue to generate a plurality of ready signals, wherein each ready signal of the plurality of ready signals indicates whether a different corresponding instruction of the plurality of instructions stored by the instruction queue is ready for execution;

a plurality of group blocks for generating a plurality of group outputs, each group block of the plurality of group blocks being operable to:

receive a different group of the plurality of ready signals that corresponds to a different group of the plurality of instructions; and generate a corresponding group output of the plurality of group outputs based on the different group of the plurality of ready signals, wherein the corresponding group output of the plurality of group outputs indicates a group set within the different group of the plurality of instructions having a highest instruction execution priority among the different group of the plurality of instructions that are ready for execution;

a global instruction block configured to:

receive the plurality of group outputs from the plurality of group blocks; and generate a global grant output based on the plurality of group outputs, wherein the global grant output indicates a global set of the plurality of instructions having the highest instruction execution priority among the plurality of instructions that are ready for execution; and a first plurality of shifters configured to generate the plurality of group outputs, each shifter of the first plurality of shifters being operable to generate the corresponding group output of the plurality of group outputs such that the corresponding group output of the plurality of group outputs comprises a first group of one-hot outputs; and wherein, for each one-hot output in the first group of one-hot outputs, the one-hot output in the first group of one-hot outputs corresponds to a corresponding instruction in the different group of the plurality of instructions and indicates a number of the different group of the plurality of instructions having an instruction execution priority that is higher than the instruction execution priority of the corresponding instruction and that is also ready for execution.

5. The instruction issue circuit of claim 4, wherein the first plurality of shifters comprises a lowest priority shifter and one or more higher priority shifters and wherein:

the different group of the plurality of instructions that corresponds to the lowest priority shifter has instruction execution priorities lower than the instruction execution priorities for the different group of the plurality of instructions that corresponds to each of the one or more of the higher priority shifters; and for the corresponding group output of each of the plurality of group outputs that are generated by the higher priority shifters, the corresponding group output of each of the plurality of group outputs further comprises another one-hot output wherein, the another one-hot output indicates a total number of the different group of the plurality of instructions that are ready for execution.

6. The instruction issue circuit of claim 4, wherein the global instruction block is further configured to:
generate an update output that indicates in which of a plurality of queue entries each of a residual set of the plurality of instructions is to be stored once the global set of the plurality of instructions has been issued for execution and thereby maintain the instruction execution priority of the residual set once the global set has been issued.

7. An instruction issue circuit comprising:
an instruction queue operable to store a plurality of instructions so that the plurality of instructions are ordered in accordance with an instruction execution priority;
a ready generation circuit operably associated with the instruction queue to generate a plurality of ready signals, wherein each ready signal of the plurality of ready signals indicates whether a different corresponding instruction of the plurality of instructions stored by the instruction queue is ready for execution;
a plurality of group blocks for generating a plurality of group outputs, each group block of the plurality of group blocks being operable to:
receive a different group of the plurality of ready signals that corresponds to a different group of the plurality of instructions; and
generate a corresponding group output of the plurality of group outputs based on the different group of the plurality of ready signals, wherein the corresponding group output of the plurality of group outputs indicates a group set within the different group of the plurality of instructions having the highest instruction execution priority among the different group of the plurality of instructions that are ready for execution;
a global instruction block configured to:
receive the plurality of group outputs from the plurality of group blocks; and
generate a global grant output based on the plurality of group outputs, wherein the global grant output indicates a global set of the plurality of instructions having the highest instruction execution priority among the plurality of instructions that are ready for execution, wherein the plurality of group blocks comprise a plurality of sorters that generate the plurality of group outputs, each sorter of the plurality of sorters being configured to generate the corresponding group output of the plurality of group outputs for the group block such that the corresponding group output of the plurality of group outputs comprises:
a ready indicator that indicates a number of the different group of the plurality of instructions that are ready for execution;
an address set wherein each bit address in the address set is for an instruction of the different group of the plurality of instructions that are ready for execution and has the highest instruction execution priority among the different group of the plurality of instructions; and
wherein the global instruction block comprises a one-hot converter circuit configured to generate a plurality of one-hot outputs, wherein the one-hot converter circuit is configured to:
receive the ready indicator for each corresponding group output of the plurality of group outputs; and
convert the ready indicator into a one-hot output that indicates the number of the different group of the plurality of instructions that are ready for execution.

8. The instruction issue circuit of claim 7, wherein the global instruction block further comprises:
a select generator configured to:
receive the plurality of one-hot outputs; and
generate a highest instruction execution priority address select output based on the plurality of one-hot outputs; and
a multiplexer configured to:
receive the address set of each of the plurality of sorters and the global grant output address select output; and
select an issue set from the address set of each of the plurality of sorters based on the global grant output address select output, wherein the issue set indicates one or more addresses from the address set of each of the plurality of sorters for one or more instructions of the plurality of instructions to be issued.

9. The instruction issue circuit of claim 8, wherein the global instruction block further comprises:
an issue counter configured to:
receive the plurality of one-hot outputs;
generate a one-hot issue indicator that indicates a total number of the plurality of instructions to issue based on the plurality of one-hot outputs;
a decoder configured to:
receive the issue set from the multiplexer and the one-hot issue indicator from the issue counter; and
decode the issue set in accordance with the one-hot issue indicator to generate the global grant output that indicates the global set of the plurality of instructions having a highest instruction execution priority among the plurality of instructions that are ready for execution.

10. A method for implementation within a superscalar pipeline, comprising:
storing a plurality of instructions so that the plurality of instructions are ordered in accordance with an instruction execution priority, wherein storing the plurality of instructions comprises storing the plurality of instructions within an instruction queue comprising a plurality of queue entries so that each instruction of the plurality of instructions is stored in a different corresponding one of the plurality of queue entries;
generating a plurality of ready signals, wherein each ready signal of the plurality of ready signals indicates whether a different corresponding one of the plurality of instructions is ready for execution;
generating a plurality of group outputs, wherein, for each corresponding group output of the plurality of group outputs, the corresponding group output of the plurality of group outputs is generated based on a different group of the plurality of ready signals that corresponds with a different group of the plurality of instructions and wherein the corresponding group output of the plurality of group outputs indicates a group set within the different group of the plurality of instructions having a highest instruction execution priority among the different group of the plurality of instructions that are ready for execution; and
generating a global grant output based on the plurality of group outputs, wherein the global grant output indicates a global set of the plurality of instructions having the highest instruction execution priority among the plurality of instructions that are ready for execution.

11. The method of claim 10, further comprising:
generating a plurality of one-hot outputs in response to the global grant output, wherein each one-hot output of the plurality of one-hot outputs indicates in which of the plurality of queue entries each of a residual set of the plurality of instructions is to be stored once the global set of the plurality of instructions has been issued for execution and thereby maintain the instruction execution priority of the plurality of instructions.

12. The method of claim 11, wherein:
generating the plurality of group outputs comprises, for each of the plurality of group outputs, generating the corresponding group output of the plurality of group outputs such that the corresponding group output of the plurality of group outputs comprises a first group of one-hot outputs wherein, for each one-hot output in the first group of one-hot outputs, the one-hot output in the first group of one-hot outputs corresponds to a corresponding instruction in the different group of the plurality of instructions and indicates a number of the different group of the plurality of instructions having an instruction execution priority that is higher than the instruction execution priority of the corresponding instruction and that is also ready for execution.

13. The method of claim 12, further comprising generating an update output that indicates in which of the plurality of queue entries each of a residual set of the plurality of instructions is to be stored once the global set of the plurality of instructions has been issued for execution and thereby maintain the instruction execution priority of the plurality of instructions once the global set of the plurality of instructions has been issued.

* * * * *